(12) United States Patent
Cakmak et al.

(10) Patent No.: US 11,077,631 B2
(45) Date of Patent: Aug. 3, 2021

(54) CONTINUOUS ROLL-TO-ROLL PROCESS DESIGN FOR VERTICAL ALIGNMENT OF PARTICLES USING ELECTRIC FIELD

(71) Applicants: Mukerrem Cakmak, Munroe Falls, OH (US); Saurabh Batra, Akron, OH (US)

(72) Inventors: Mukerrem Cakmak, Munroe Falls, OH (US); Saurabh Batra, Akron, OH (US)

(73) Assignee: The University of Akron

( * ) Notice: Subject to any disclaimer, the term of this patent is extended or adjusted under 35 U.S.C. 154(b) by 980 days.

(21) Appl. No.: 14/893,182

(22) PCT Filed: May 30, 2014

(86) PCT No.: PCT/US2014/040253
§ 371 (c)(1),
(2) Date: Nov. 23, 2015

(87) PCT Pub. No.: WO2014/194206
PCT Pub. Date: Dec. 4, 2014

(65) Prior Publication Data
US 2016/0089842 A1    Mar. 31, 2016

Related U.S. Application Data

(60) Provisional application No. 61/828,869, filed on May 30, 2013.

(51) Int. Cl.
*B29C 71/00* (2006.01)
*B29C 35/08* (2006.01)
(Continued)

(52) U.S. Cl.
CPC ...... *B29C 71/0072* (2013.01); *B29C 35/0805* (2013.01); *B29C 71/0081* (2013.01);
(Continued)

(58) Field of Classification Search
USPC .................................................. 264/435, 436
See application file for complete search history.

(56) References Cited

U.S. PATENT DOCUMENTS

| | | | |
|---|---|---|---|
| 4,588,537 A * | 5/1986 | Klaase | B01D 39/1623 264/248 |
| 4,810,435 A * | 3/1989 | Kamada | B05C 9/12 264/485 |

(Continued)

*Primary Examiner* — Jeffrey M Wollschlager
*Assistant Examiner* — Armand Melendez
(74) *Attorney, Agent, or Firm* — Renner Kenner Greive Bobak Taylor & Weber

(57) ABSTRACT

A method of preparing an anisotropic polymer film using an electric field generator. The method of preparing an electric field generator comprising supplying an electric field across an electric field application zone, where the electric field is generated by a first electrode having a first charge and a second electrode having a charge opposite of the first, passing a polymer film that optionally includes dispersed particles through the electric field application zone, where the polymer film contacts the first electrode to induce orientation, and freezing the polymer film to lock the orientation before the polymer film exits the electric field application zone.

13 Claims, 34 Drawing Sheets

(51) Int. Cl.
  *B29C 71/02*    (2006.01)
  *B29K 67/00*    (2006.01)
  *B29K 105/00*   (2006.01)
  *B29K 105/16*   (2006.01)
  *B29K 509/00*   (2006.01)

(52) U.S. Cl.
  CPC ...... *B29C 71/02* (2013.01); *B29C 2035/0827* (2013.01); *B29C 2071/022* (2013.01); *B29K 2067/003* (2013.01); *B29K 2105/0002* (2013.01); *B29K 2105/162* (2013.01); *B29K 2509/00* (2013.01); *B29K 2995/0003* (2013.01); *B29K 2995/0006* (2013.01); *B29K 2995/0044* (2013.01)

(56) References Cited

U.S. PATENT DOCUMENTS

| | | | |
|---|---|---|---|
| 2002/0114923 A1* | 8/2002 | Lilly | B05D 1/42 428/141 |
| 2005/0139813 A1* | 6/2005 | Yamaguchi | G02F 1/3611 252/582 |
| 2008/0015284 A1 | 1/2008 | Cakmak | |
| 2009/0020921 A1 | 1/2009 | Cakmak | |
| 2009/0187000 A1* | 7/2009 | Nakai | B29C 71/0072 527/300 |
| 2010/0133488 A1 | 6/2010 | Giakos | |
| 2010/0162666 A1* | 7/2010 | Takahashi | B29C 35/0266 53/461 |
| 2010/0260941 A1* | 10/2010 | Bushmire | C08J 7/123 427/515 |
| 2012/0135156 A1 | 5/2012 | Cakmak | |

* cited by examiner

CONTINUOUS ROLL-TO-ROLL PROCESS DESIGN FOR VERTICAL ALIGNMENT OF PARTICLES USING ELECTRIC FIELD

CROSS-REFERENCE TO RELATED APPLICATIONS

This application claims priority from U.S. Provisional Patent Application No. 61/828,869 filed on May 30, 2013, the contents of which are incorporated herein by reference.

FIELD OF THE INVENTION

On or more embodiments relate to apparatuses for the preparation of anisotropic polymer film and processes for the preparation of anisotropic polymer film.

BACKGROUND OF THE INVENTION

The addition of nanoparticles in polymeric systems offers potential for new and unique material properties at low particle concentrations. This field has been heavily explored for mechanical and diffusion property enhancements with limited success. Many of these nanoparticles exhibit high anisotropy in their properties of interest including thermal conductivity, diffusivity, capacitance, optical, compressive strength etc. However, traditional processing methods do not take advantage of these anisotropies as they are unable to orient the particles in the thickness direction. In many applications like flexible electronics, membranes, supercapacitors, fuel cells, photovoltaics etc., the property of interest to enhance is in the thickness "Z" direction. This is possible by utilizing directed field assisted assembly techniques such as electric field.

Present electric fields applications use a two plate arrangement to apply electric field. The two plate arrangement includes a stationary top plate with an air gap between the polymer film and the plates. Because of the distance between the plate and the lack of contact between the polymer film and the plates, electric field applications that utilize an air require the use of a very large electric field to achieve an electric filed effect within the polymer film.

Presently a need exist to provide an electric field useful for preparing anisotropic polymer films with low electric fields and in continuous applications, such as roll-to-roll applications.

SUMMARY OF THE INVENTION

A first embodiment provides a method of preparing an anisotropic polymer film comprising: supplying an electric field across an electric field application zone, where the electric field is generated by a first electrode having a first charge and a second electrode having a charge opposite of the first, passing a polymer film that optionally includes dispersed particles through the electric field application zone, where the polymer film contacts the first electrode to induce orientation, and freezing the polymer film to lock the orientation before the polymer film exits the electric field application zone.

A second embodiment provides a method as in the first embodiment, where the polymer film is rolled onto a take-up roll after the polymer film exits the electric field application zone.

A third embodiment provides a method as in the either the first or second embodiment, where the polymer film includes dispersed dielectric particles.

A forth embodiment provides a method as in any of the first through third embodiments, where the film is vertically oriented chain of particles with respect to the direction of the polymer thickness.

A fifth embodiment provides a method as in any of the first through forth embodiments, wherein the first electrode and second electrode rotate as the film passes through the electric field application zone.

A sixth embodiment provides a method as in any of the first through fifth embodiments, where the first electrode is a belt wrapped around two rollers.

A seventh embodiment provides a method as in any of the first through sixth embodiments, where the belt is a transparent conductive film An eighth embodiment provides a method as in any of the first through seventh embodiments, where the polymer film is UV-curable and the orientation of the polymer film is frozen by applying a UV light.

A ninth embodiment provides a method as in any of the first through eighth embodiments, where the belt is metal.

A tenth embodiment provides a method as in any of the first through ninth embodiments, where the polymer film is heat curable and the orientation of the polymer film is frozen by a heating zone.

An eleventh embodiment provides a method as in any of the first through tenth embodiments, where the polymer is passed through a heating zone to heat the polymer above the polymer's melting point, and the orientation of the polymer film is frozen by passing the polymer through a cooling zone.

A twelfth embodiment provides a method as in any of the first through eleventh embodiments, where the belt is perforated metal.

A thirteenth embodiment provides a method as in any of the first through twelfth embodiments, where the polymer film is a polymer solution, and the orientation of the polymer film is frozen by a heating zone.

A fourteenth embodiment provides a method as in any of the first through thirteenth embodiments, where the birefringence of the polymer film is measured after the polymer film exits the electric field application zone.

A fifteenth embodiment provides a device for preparing anisotropic polymer films comprising: an electric field generator that defines an electric field application zone, the electric field generator comprising of a first electrode that can supply a charge comprising a conductive belt around two rollers opposite a second electrode that can supply a charge opposite of the first electrode; a conveyer, wherein the conveyer is situated to pass a polymer through the electric filed generator; an adjustable interstice for adjusting the distance between the first electrode and the second electrode, and wherein the adjustable interstice can adjust the distance between the first and second electrode to keep the first and second electrode in contact the polymer film; and means for freezing the orientation of the polymer film with the electric field application zone.

A sixteenth embodiment provides a device as in the fifteenth embodiment, where the belt on the first electrode is a transparent conductive film.

A seventeenth embodiment provides a device as in the either the fifteenth or sixteenth embodiment, where the means for freezing the orientation of the polymer is a UV light.

An eighteenth embodiment provides a device as in any of the seventeenth through seventeenth embodiments, where the belt on the first electrode is metal.

An nineteenth embodiment provides a device as in any of the eighteenth through eighteenth embodiments, where the device includes a heating zone to heat the polymer above the polymer's melting point, and the means to freeze the orientation of the polymer film is a cooling zone.

A twentieth embodiment provides a device as in any of the eighteenth through nineteenth embodiments, where the belt on the first electrode is perforated metal.

A twenty-first embodiment provides a device as in any of the eighteenth through twentieth embodiments, where the means to freeze the orientation of the polymer film is a heating zone.

A twenty-second embodiment provides a device as in any of the eighteenth through twenty-first embodiments, where the device further comprises a polymer film, and the first electrode and the second electrode are in contact with the polymer film.

A twenty-third embodiment provides a device as in any of the eighteenth through twenty-second embodiments, where the polymer film is UV-curable.

A twenty-forth embodiment provides a device as in any of the eighteenth through twenty-third embodiments, where the polymer film is heat curable.

A twenty-fifth embodiment provides a device as in any of the eighteenth through twenty-forth embodiments, where the polymer film is a polymer solution.

A twenty-sixth embodiment provides a device as in any of the eighteenth through twenty-fifth embodiments, further comprising a take-up roll down line from the electric field application zone A twenty-seventh embodiment provides a device as in any of the eighteenth through twenty-sixth embodiments, further comprising at least one processing zone selected from the group consisting of a solvent evaporation zone, an annealing zone, a UV curing zone, a magnet zone a steady shear zone, and an oscillatory shear zone.

DETAILED DESCRIPTION OF ILLUSTRATIVE EMBODIMENTS

Figure 1:
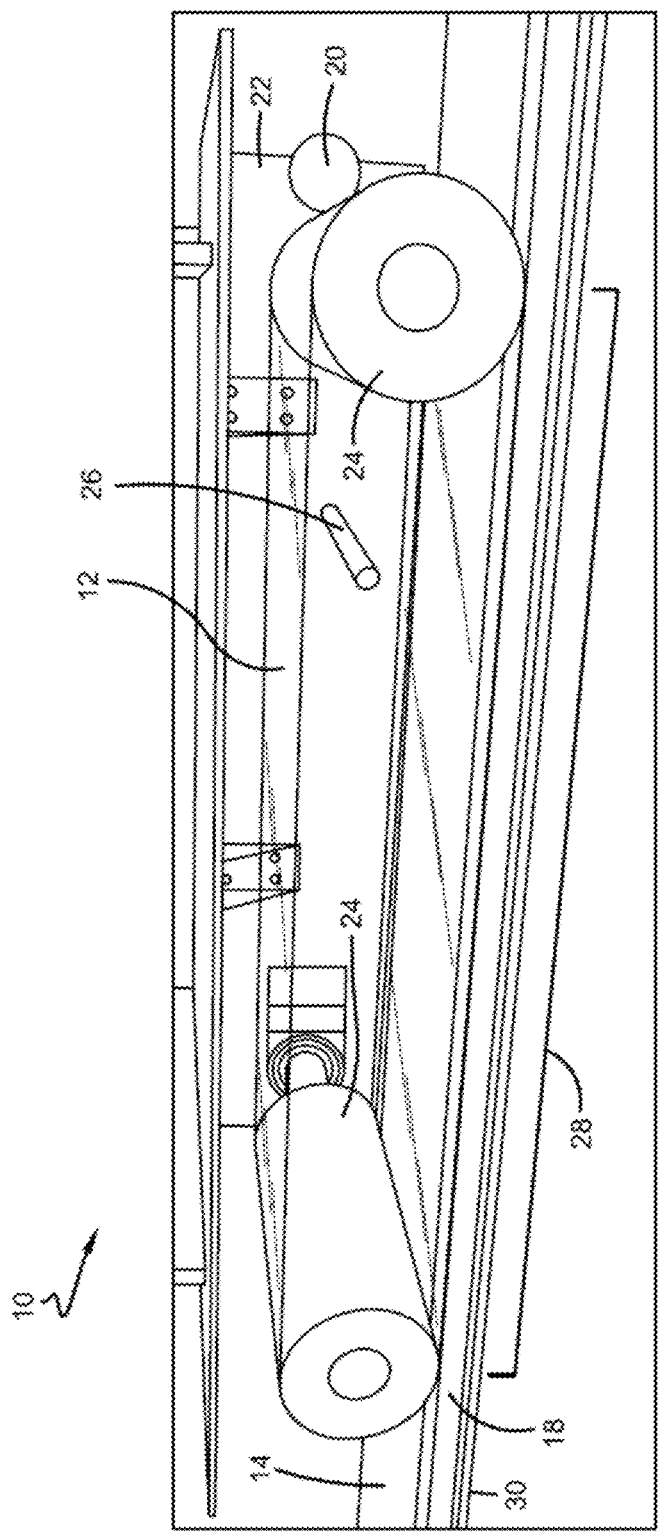
FIG. 1 provides a schematic of one or more embodiments, where the first electrode is a transparent conductive polymer film belt.

In one or more embodiments a method of preparing an anisotropic polymer film is provided comprising supplying an electric field across an electric field application zone, where the electric field is generated by a first electrode having a first charge and a second electrode having a charge opposite of the first, passing a polymer film that through the electric field application zone, where the polymer film contacts the first electrode to induce orientation within the polymer, and freezing the polymer film to lock the orientation within the polymer before the polymer film exits the electric field application zone.

The anisotropic polymer film may be prepared by inducing orientation within a polymer film. Advantageously, it has been found that when an electric field is generated with a first and a second electrode in contact with the polymer film, as opposed to two plates with an air gap, better orientation may be obtained with using an electric field of a smaller power. The orientation within the polymer may refer to orientation of polymer phases within the polymer film, spatial orientation of particles that may have been dispersed in the film, or the orientation of both polymer phases and spatial orientation of particles within the film. For example, orientation of phases within a polymer includes the orientation of the blocks of a block polymer film to produce periodic structures such as lamellae, cylinders, and gyroids. Examples of the spatial orientation of particles includes particle chains, stratifications or layers of polymer and particles, or particle gradients within a polymer.

In one or more embodiments, alternating current (AC) may be used with the electric field generator. In other embodiments, direct current (DC) may be used with the electric field generator. In certain embodiments, the type of current may be selected to provide a particular orientation within a polymer. For example, if a dielectric particle is dispersed in the polymer film, AC may be used to organize the dielectric particles into chains. Alternatively, if a gradient of particles dialectic particles is desired, DC may be used.

As noted above, it has been found that when a first electrode and second electrode are in contact with the polymer film a low voltage may be used to create an electric field to induce orientation in a polymer film. In one or more embodiments, the voltage is a few Volts to Several thousand KiloVolts sufficient to cause the orientation that depends on the matrix and disperse phase electrical properties such as dielectric constant. In one or more embodiments, the voltage is between 1 volt and the polymer breakdown voltage.

The device for preparing an anisotropic polymer using an electric field may be referred to as an electric field generator. The electric filed generator may be utilized in a continuous process. In one or more embodiments, a continuous processes may include a roll to roll process, where a roll of polymer film is provided, the polymer film is unrolled and moved through the electric field application zone to induce orientation in the polymer film, and rerolled on a take-up roll down line from the electric field application zone. In some embodiments, a continuous process may be provided where the polymer film is prepared, for example by polymer film casting on one end of the electric filed generator, the polymer film is then moved through the electric field application zone to induce orientation in the polymer film, and rolled on take-up roll down line from the electric field application zone.

Suitable polymers that may be used to create anisotropic polymer films include UV curable polymers, thermally curable polymers, and polymers in solution. The polymers may be heteropolymers or copolymers.

In one or more embodiments, the polymer film may include a block copolymer. In one or embodiments, the block copolymer may be a di-block copolymer represented by the formula: A-B, where A represents a block of repeating units and B represents a second different block of repeating units. In one or embodiments, the block copolymer may be a tri-block copolymer represented by the formula: A-B-A or A-B-C, where A represents a block of repeating units, B represents a second different block of repeating units, and C represents a third different block of repeating units. In one or embodiments, the block copolymer may be a tetra-block copolymer represented by the formula: A-B-A-B, A-B-C-A, A-B-C-B, or A-B-C-D, where A represents a block of repeating units, B represents a second different block of repeating units, and C represents a third different block of repeating units, and D represents a fourth different block of repeating units.

In embodiment that use a polymer in solution useful solvents for dissolving the polymer include, N-methyl pyrrolidone (NMP), dimethylformamide (DMF), dimethylsulfide (DMS), dimethylsulfoxide (DMSO), dimethyl acetamide (DMAC), cyclohexane, pentane, cyclohexanone, acetone, methylene chloride, carbon tetrachloride, ethylene dichloride, chloroform, ethanol, isopropyl alcohol (IPA), butanols, THF, MEK, MIBK, toluene, heptane, hexane, 1-pentanol, water, or suitable mixtures of two or more thereof.

In one or more embodiments, the concentration of polymer in solvent in the polymer solution is from about 5 weight percent to about 50 weight percent, in other embodiments from about 10 weight percent to about 45 weight percent, in other embodiments from about 15 weight percent to about 40 weight percent, in other embodiments from about 20 weight percent to about 35 weight percent, in still other embodiments from about 25 weight percent to about 30 weight percent.

As noted above, the polymer film may include particles. Suitable particle for use in preparing anisotropic polymer films include conducting particles semiconducting particles or dielectric particles. It should be noted, that in certain embodiment, particularly where a semi-conducting or conducting particle is used, an insulating layer may be required between the polymer film and the electrodes.

Suitable conductive particles may be prepared from Co, Ni, CoPt, FePt, FeCo, $Fe_3O_4$, $Fe_2O_3$, and $CoFe_2O_4$. Suitable semiconductive particles may be prepared from ZnS, CdSe, CdS, CdTe, ZnO, Si, Ge, GaN, GaP, GaAS, InP, and InAs. Additional particles that may be Conductive or semiconductive include carbon based nanoparticles, carbon black, carbon nanotubes (single as well as multi-walled) as well as other inorganic and organic synthetic or natural nanoparticles.

In one or more embodiments, the size of the particle could be in the range of about 10 angstroms (0.1 nm) to about 500 micrometers.

In one or more embodiments, the polymer film may include dielectric particles. As noted above, the current may be used to effect the spatial arrangement of dielectric particles. In one or more embodiments, a vertically oriented chain of dialectic particles may be prepared. The vertically oriented polymer chain is vertically oriented with respect to the polymer thickness. The vertical orientation may be referred to as the z-direction or z-orientation. Suitable dielectric particles include organically modified clays, glass spheres, and glass fibers.

In one or more embodiments, the electric field generator may be included in a polymer film processing device. The polymer film processing device may include one or more other zones for processing a polymer film. In certain embodiments, the zones of the polymer processing device are situated along a roll-to-roll processing line. Exemplary zones for processing a polymer that may be included in a polymer processing device include, but are not limited to, solvent evaporation zones, annealing zones, UV curing zones, magnet zones steady shear zones, and oscillatory shear zones. An exemplary polymer processing device is described in WO 2011/008870, which is incorporated by reference.

In one or more embodiments, an electric field generator comprises a first electrode that can supply a charge comprising a conductive belt around two rollers opposite a second electrode that can supply a charge opposite of the first electrode; a conveyer, wherein the conveyer is situated to pass a polymer through the electric filed generator; an adjustable interstice for adjusting the distance between the first electrode and the second electrode, and wherein the adjustable interstice can adjust the distance between the first and second electrode to keep the first and second electrode in contact the polymer film; and means for freezing the orientation of the polymer film with the electric field application zone. The electric field application zone is the zone between the first and second electrodes where the electric field is present.

In one or more embodiments the first electrode is a belt wrapped around two rollers. In these or other embodiment, the belt rotates as the polymer film is moved through the electric field application zone. Because the first electrode is in contact with the polymer film, a difference in speed between the polymer film and the rotating first electrode may create a shearing effect in the polymer film. In one or more embodiment, the first electrode is rotated at the same speed as the polymer film to avoid sheering. In other embodiments, the first electrode is rotated at a different speed than the polymer film to provide sheering.

In one or more embodiments, an electric field generator may be used to induce orientation and freeze the orientation within a UV curable polymer film. In these or other embodiments the means for freezing the orientation of the polymer is a UV light. In these or other embodiments, the first electrode is a transparent conductive film. The UV light may be placed within the belt to cure the UV curable polymer film prior to the film exiting the electric filed application zone.

Examples of UV curable polymer films include those monomers, oligomers, and polymers that can be reacted by the action of light. A specific example of a UV curable polymer film includes those containing acrylic groups.

In one or more embodiments, the transparent conductive film allows all wavelengths of light to pass. In other embodiments, the transparent conductive film may block all or a portion of wavelengths not required to cure the UV curable polymer film.

A specific example of transparent conductive film is indium tin oxide coated polyethylene terephthalate.

A representative example of an electric field generator useful for inducing the orientation and freezing the orientation within a UV curable polymer film is disclosed with reference to FIG. 1. FIG. 1 provides an electric field generator 10. The electric field generator 10 includes a back plate 22 with that has two rollers 24. Wrapped around the rollers 24 is a conductive belt 12. The conductive belt 12 is a transparent, conductive, film belt. In contact with the conductive belt 12 is a voltage source 20. In one or more embodiments, the voltage source 20 may be spring loaded (not depicted) to be in constant contact with the electrode 12. The height of the conductive belt 12 may be adjusted by moving the back plate 22. The conductive belt 12 may be adjusted so that it contacts the polymer film 14. The polymer film 14 optionally rests upon and is transported under the conductive belt 12 by conductive substrate 18. In one or more embodiments, conductive substrate 18 may be an electrode or a ground. In one or more embodiments, the conductive substrate 18 may rest upon a conveyer 30 that may act as an electrode or a ground. In other embodiments, the polymer film 14 may rest directly upon the conveyer 30. The electric filed application zone 28 is the area between the conductive belt 12 and the other electrode (substrate 18 or conveyer 30). The UV light 26 is situated with the conductive belt 12 to cure the polymer film 14 prior to the film exiting the electric field application zone 18.

In one or more embodiments, an electric field generator may be used to induce orientation and freeze the orientation within a thermally curable polymer film. In these or other embodiments the means for freezing the orientation of the polymer is temperature control. In these or other embodiments, a heating zone may be used to heat the polymer film above the polymer's melting point, and the means to freeze the orientation of the polymer film is a cooling zone. The Heating and cooling zone may be separated with a space.

Exemplary heating zones may be electric powered hot plates, infrared underbed heaters and air temperature control systems. Exemplary cooling zones may be chilled water circulation systems directly or indirectly contacting the material.

In these or other embodiments, the first electrode is a flexible conductive metal belt. Example of flexible conductive metals include copper, steel and any other suitable conductive metal mesh coated with an insulator.

Examples of thermally curable polymer films include those that can be cured at elevated temperatures converting the material from initial fluid state to more rigid state to maintain the developed organization of the dispersed phase by external field. There are numerous systems that are mentioned in polymer chemistry books.

Figure 2:
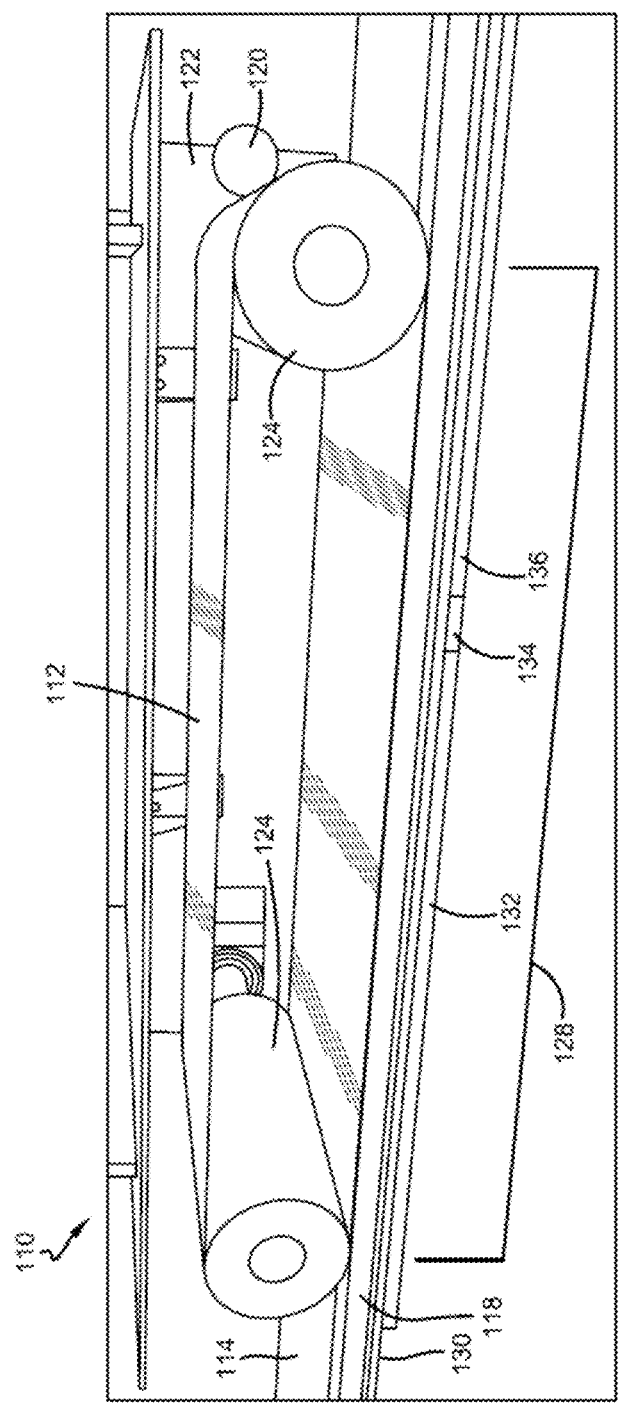
FIG. 2 provides a schematic of one or more embodiments, where the first electrode is a flexible conductive metal belt.

A representative example of an electric field generator useful for inducing the orientation and freezing the orientation within a thermally curable polymer film is disclosed with reference to FIG. 2. FIG. 2 provides an electric field generator 110. The electric field generator 110 includes a back plate 122 with that has two rollers 124. Wrapped around the rollers 124 is a conductive belt 112. The conductive belt 112 is a flexible conductive metal. In contact with the conductive belt 112 is a voltage source 120. In one or more embodiments, the voltage source 120 may be spring loaded (not depicted) to be in constant contact with the electrode 112. The height of the conductive belt 112 may be adjusted by moving the back plate 122. The conductive belt 112 may be adjusted so that it contacts the polymer film 114. The polymer film 114 optionally rests upon and is transported under the conductive belt 112 by conductive substrate 118. In one or more embodiments, conductive substrate 118 may be an electrode or a ground. In one or more embodiments, the conductive substrate 118 may rest upon a conveyer 130 that may act as an electrode or a ground. In other embodiments, the polymer film 114 may rest directly upon the conveyer 130. The electric filed application zone 128 is the area between the conductive belt 112 and the other electrode (substrate 118 or conveyer 130). The conductive polymer 112 may be heated above the polymer film's melting point by heating zone 132. The orientation may then be frozen as the polymer filming moves through electric filed application zone 128 by cooling zone 136. The electric field generator 110 may optionally, include a spacer 134 to separate the heating zone 132 and the cooling zone 136.

In one or more embodiments, an electric field generator may be used to induce orientation and freeze the orientation within a solution polymer film. A solution polymer film is a polymer in a solvent that produces a film when dried. In these or other embodiments the means for freezing the orientation of the polymer is a driving off the solvent using a heating zone. In these or other embodiments, the first electrode is perforated metal belt. The perforations allow the solvent gasses to be released as the solvent is driven off of the solution polymer film.

In one or more embodiments, the solution polymer film may include a solvent polymer and optionally a particle. In these or other embodiments, the solution polymer film may be prepared upline from the electric field generator. The solution polymer film may be prepared by polymer film casting. Conventional methods of polymer film casting may be used.

Examples of solution polymer films include those that can be dissolved in a solvent including polymethyl methacrylate, polycarbonate, poly amic acid, and poly amide imide.

Exemplary heating zones may be electric powered hot plates, infrared underbed heaters.

Figure 3:
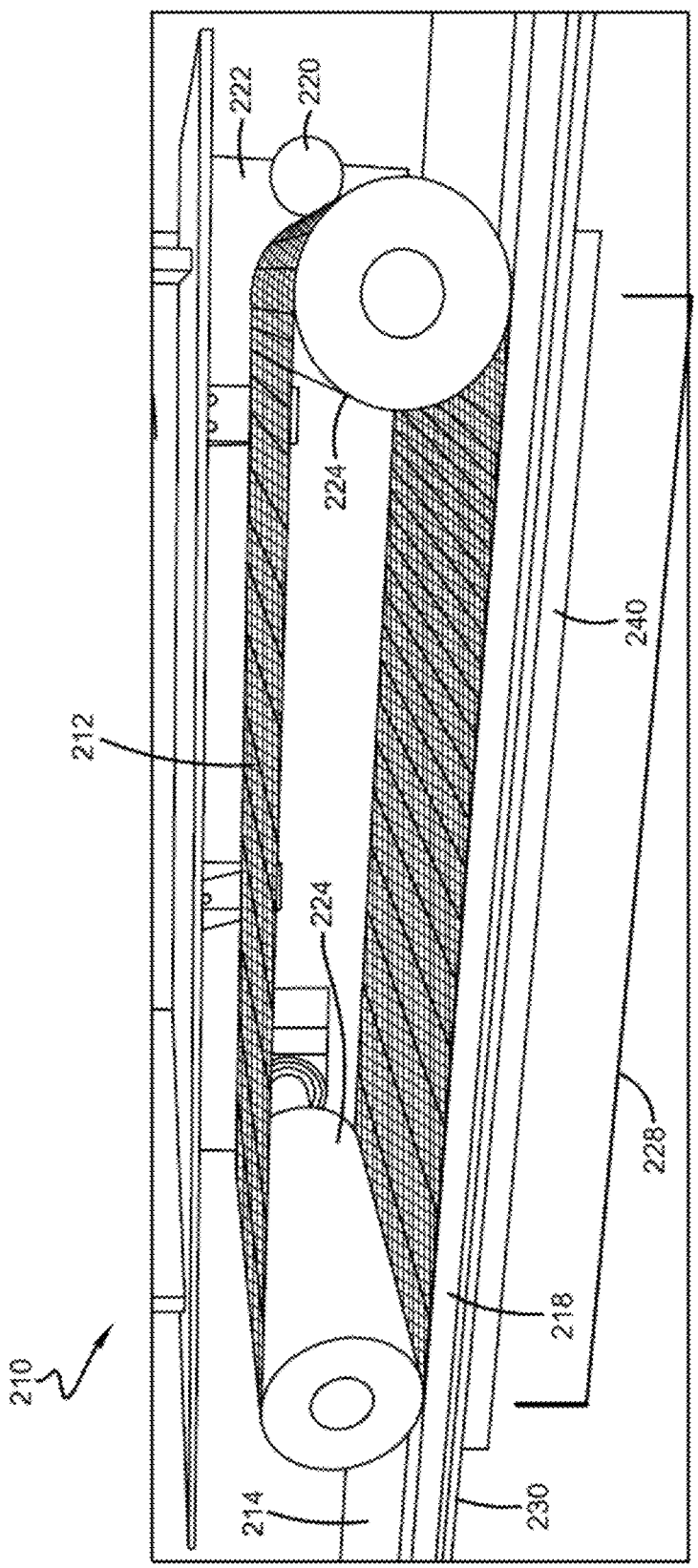
FIG. 3 provides a schematic of one or more embodiments, where the first electrode is a transparent perforated metal belt.

A representative example of an electric field generator useful for inducing the orientation and freezing the orientation within a solution polymer film is disclosed with reference to FIG. 3. FIG. 3 provides an electric field generator 210. The electric field generator 210 includes a back plate 222 with that has two rollers 224. Wrapped around the rollers 224 is a conductive belt 212. The conductive belt 212 is perforated metal belt. In contact with the conductive belt 212 is a voltage source 220. In one or more embodiments, the voltage source 220 may be spring loaded (not depicted) to be in constant contact with the electrode 212. The height of the conductive belt 212 may be adjusted by moving the back plate 222. The conductive belt 212 may be adjusted so that it contacts the polymer film 214. The polymer film 214 optionally rests upon and is transported under the conductive belt 212 by conductive substrate 218. In one or more embodiments, conductive substrate 218 may be an electrode or a ground. In one or more embodiments, the conductive substrate 218 may rest upon a conveyer 230 that may act as an electrode or a ground. In other embodiments, the polymer film 214 may rest directly upon the conveyer 230. The electric filed application zone 228 is the area between the conductive belt 212 and the other electrode (substrate 218 or conveyer 230). The heating zone 240 is situated under the polymer film 214 to evaporate the solvent to freeze the orientation of the polymer film prior to the film exiting the electric field application zone 218.

While particular embodiments of the invention have been disclosed in detail herein, it should be appreciated that the invention is not limited thereto or thereby inasmuch as variations on the invention herein will be readily appreciated by those of ordinary skill in the art. The scope of the invention shall be appreciated from the claims that follow.

EXAMPLES

The present study is divided into two parts: the first part focuses on the real time measurement system to determine the kinetics of clay orientation under the applied field with a highly instrumented integrated measurement system. The second part involves roll-to-roll continuous photocurable monomer casting based processing utilizing optimized process variables obtained in the first part, to create indefinitely long directionally anisotropic films where clay platelets are aligned through the thickness (Z-direction) of the film. The liquid casting based method was chosen for this application since particles are easier to disperse at lower viscosities of monomer as compared to melt systems. In monomer dispersed particles, the lower drag forces increase the efficacy for rotational and translational motion of particles under electric field, thus increasing the orientation of aligned nanocomposite film. To control various processing parameters and conditions along with optical properties, the optical anisotropy was measured using a real time birefringence measurement system which helped determine the kinetics of rotation of anisotropic nanoparticles and development of orientation during electric field alignment. Further using the kinetics measurements, a master curve was developed with the Electric-Optic Superposition (EOSP) principle which acts as a useful tool in building a structure property relationship to tailor various properties of nanocomposites along with processing parameters required for Roll-to-Roll manufacturing of oriented films.

Figure 4A:
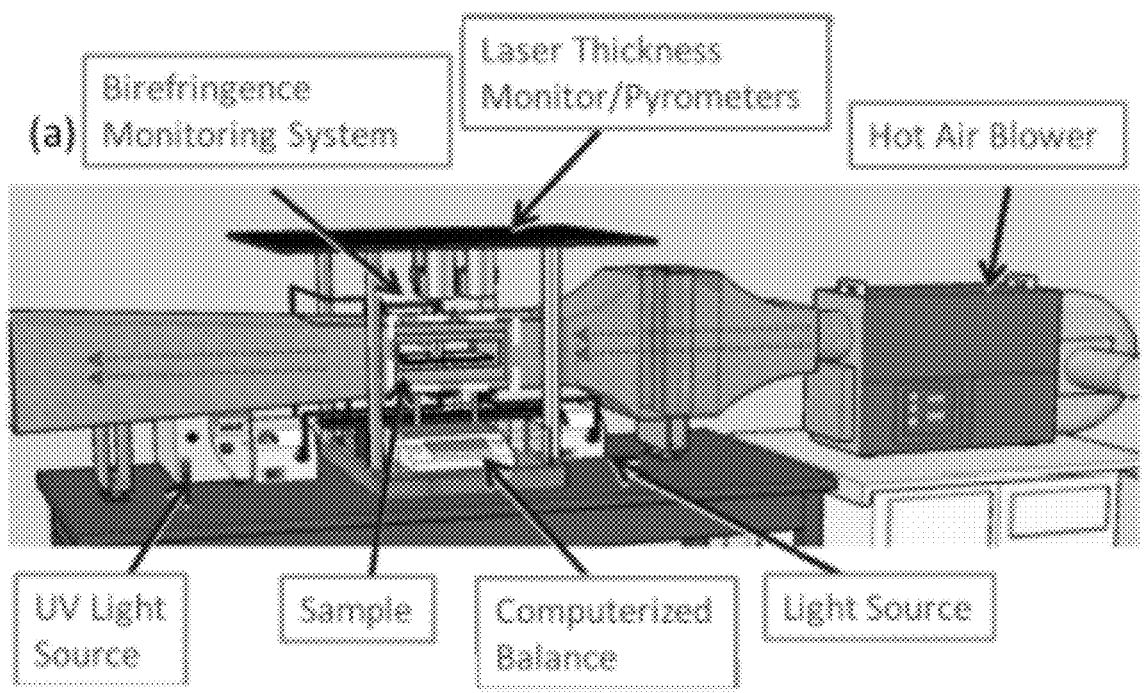
FIG. 4A provides a schematic of a real time solution drying platform which measures changes in out-of-plane and in-plane retardation along with thickness, weight and temperature measurements.
Figure 4B:
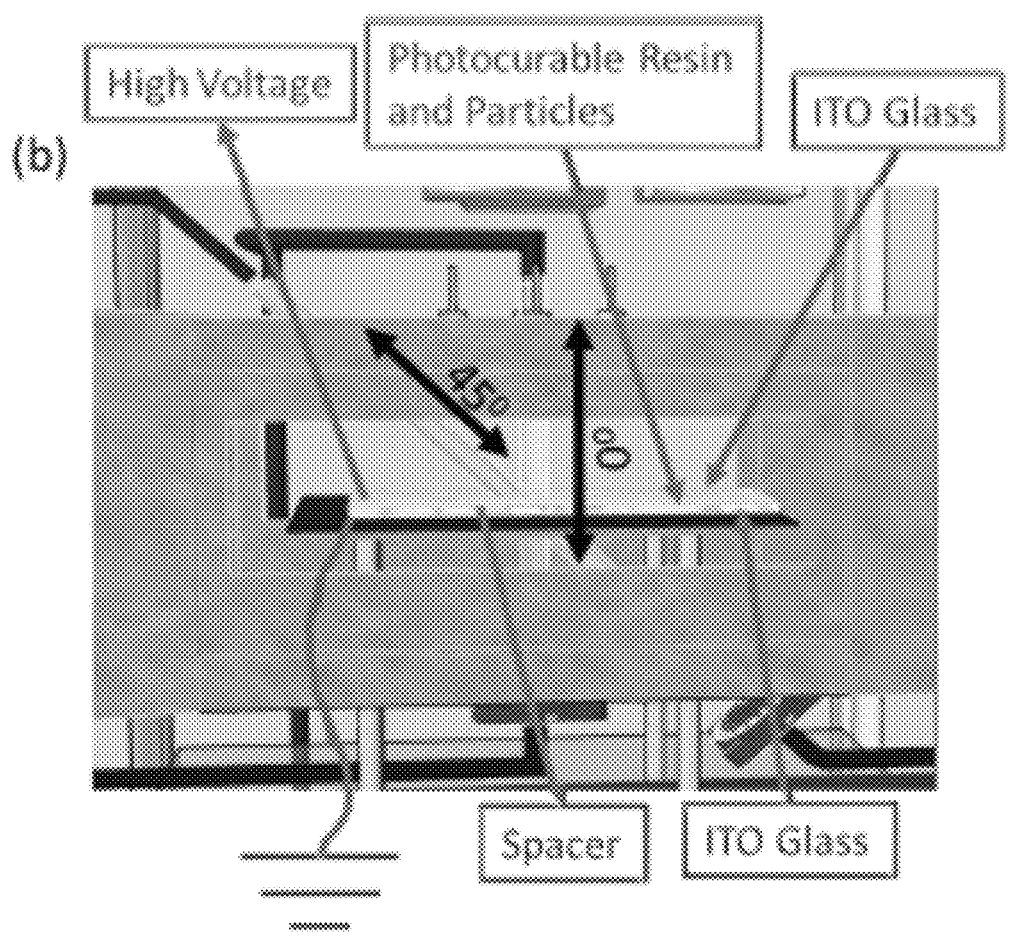
FIG. 4B provides a schematic of a real time solution drying platform which measures changes in out-of-plane and in-plane retardation along with thickness, weight and temperature measurements, modified setup to measure electric birefringence in both in-plane and out-of plane direction.

We recently developed a real time measurement system for tracking fast temporal changes in birefringence, weight, thickness and surface temperature during drying of solution cast films (FIG. 4A). Details of the instrument and its measurement capabilities on various polymeric systems can be found elsewhere. For this study, its design was enhanced to measure the changes in both in-plane and out-of-plane birefringence during electric field application. It uses two indium tin oxide (ITO) coated glasses on top of each other separated by a glass spacer which is placed in the light path (FIG. 4B) of the optical system described below. Different voltages with varying frequencies were applied through the ITO coated glasses and resulting fast temporal changes in the birefringence were recorded.

The optical system that measures the electric birefringence consists of two light sources with wavelengths in the visible range, linear polarizers, fiber optic cables and visible spectrometers (Avantes, Avaspec-NIR256-2.5). One linearly polarized light beam passes normal (parallel to the electric field vector) to measure in plane retardation (thus birefringence). The second linearly polarized light beam passes through the film at 45° to the film normal and electric field vector oriented to measure the out of plane retardation (and birefringence). The data was collected by four channel spectrometers and real time calculations at 10 data/s were carried out with custom designed software. Detailed procedures were discussed in our previous publication.

The in-plane birefringence can then be calculated by dividing the retardation measured at 0° ($R_O$) by thickness ($d_{eff}$: effective thickness contributing to retardation development) as shown in equation 1. Out-of-plane birefringence was calculated using equation $2^{62}$ where $d_{eff}$ is the thickness, $R_O$ is the measured 0° retardation, $R_\theta$ is the retardation value measured at θ degrees (where θ=45° in our system) and $\acute{\eta}$ is average refractive index of the material. Though the system measures the full dispersion curve from 350-700 nm, only the optical properties corresponding to 546 nm have been reported.

$$\Delta n_{12} = \frac{R_0}{d_{eff}} \quad (1)$$

$$\Delta n_{23} = \frac{1}{d_{eff}} \left[ \frac{R_0 - R_\theta \left(1 - \frac{\sin^2\theta}{\acute{n}^2}\right)^{1/2}}{\frac{\sin^2\theta}{\acute{n}^2}} \right] \quad (2)$$

The optical components in the system were set up to get a positive in-plane retardation when higher refractive index is in the long axis of the machine (FIG. 4A) whereas negative in-plane retardation values indicate higher refractive index is in the transverse to the long axis of the machine. Similarly, a positive out-of-plane retardation is observed for higher refractive index in the film plane whereas a negative out-of-plane retardation implies higher refractive index is in the thickness direction of the film.

When electric field is applied to a dielectric matrix containing inorganic particles, these particles undergo induced polarization, the extent of which depends on the field variables (AC or DC). The field gradients experienced by these polarized particles lead to rotational and translational motion within the matrix. Using the setup described above, the rapidly occurring rotational motion and preferential orientation direction of the intrinsically optically anisotropic particles can be tracked.

Figure 5A:
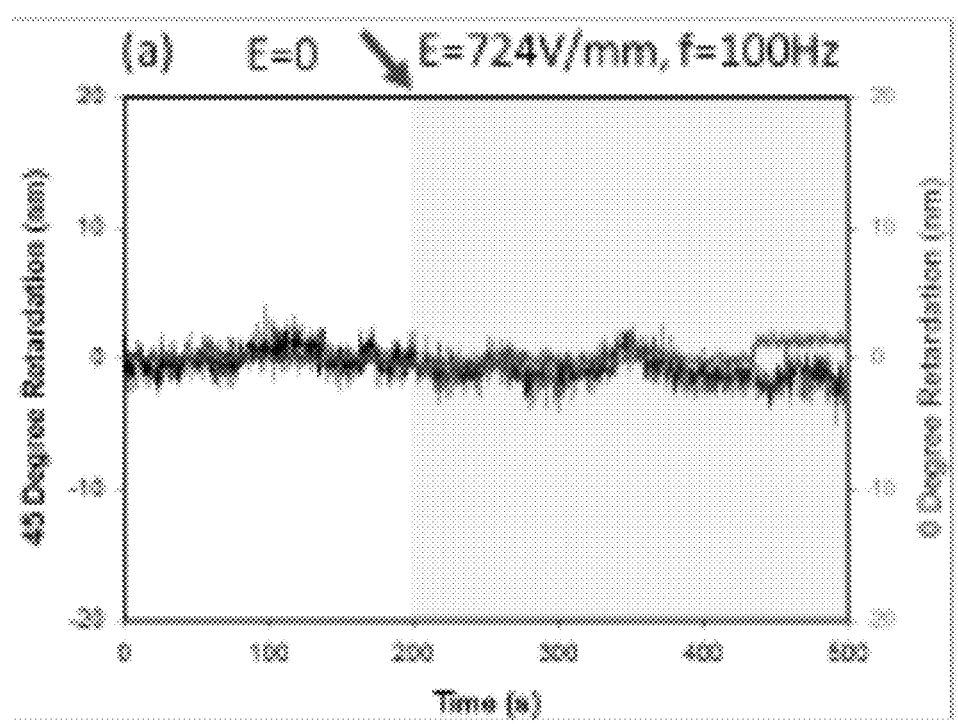
FIG. 5A provides a chart of response of in-plane and out-of-plane retardation on application of electric field on pure resin. Arrows indicate the start of the e-field.
Figure 5B:
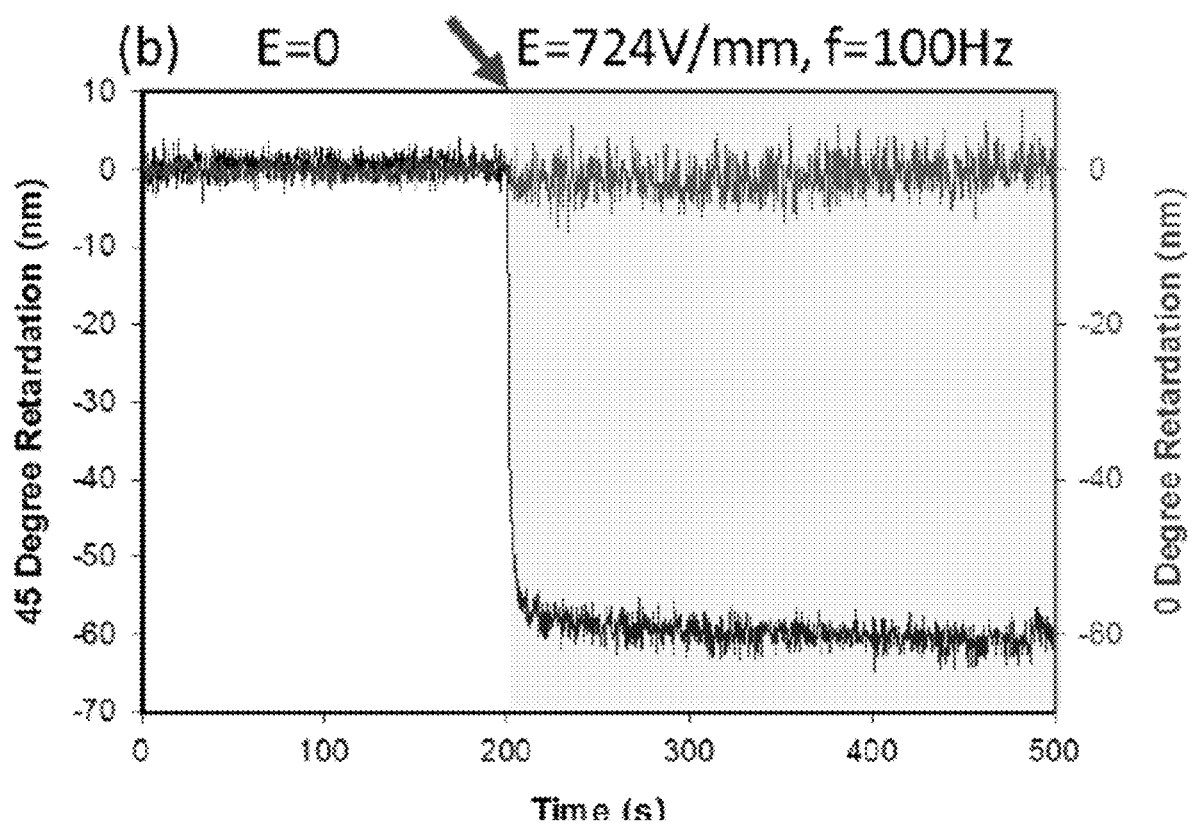
FIG. 5B provides a chart of response of in-plane and out-of-plane retardation on application of electric field on 6 wt. % clay filled system with applied field of 724V/mm at 100 Hz. Arrows indicate the start of the e-field.

As the clay platelets (Cloisite 30B) in monomer (NOA65) were subjected to an AC (100 Hz) electric field through the thickness direction (FIG. 5B), the in-plane retardation remained at zero value, however, the out of plane retardation rapidly decreased to a negative value. To verify if this response was only due to clay orientation and there was no contribution of monomer on retardation, the same test was repeated (FIG. 5A) without any filler and no change in both in-plane and out-of-plane retardation was observed with applied electric field. Since the retardation changes were only observed in the presence of clay platelets, the effective thickness of clay platelets in the polymer film was used to calculate the corresponding in-plane and out-of-plane birefringence changes using equation 1 and 2. The average refractive index of the clay filled monomers was measured using Abbe Refractometer, Table S1 shows the refractive indices at different clay concentrations.

Figure 5C:
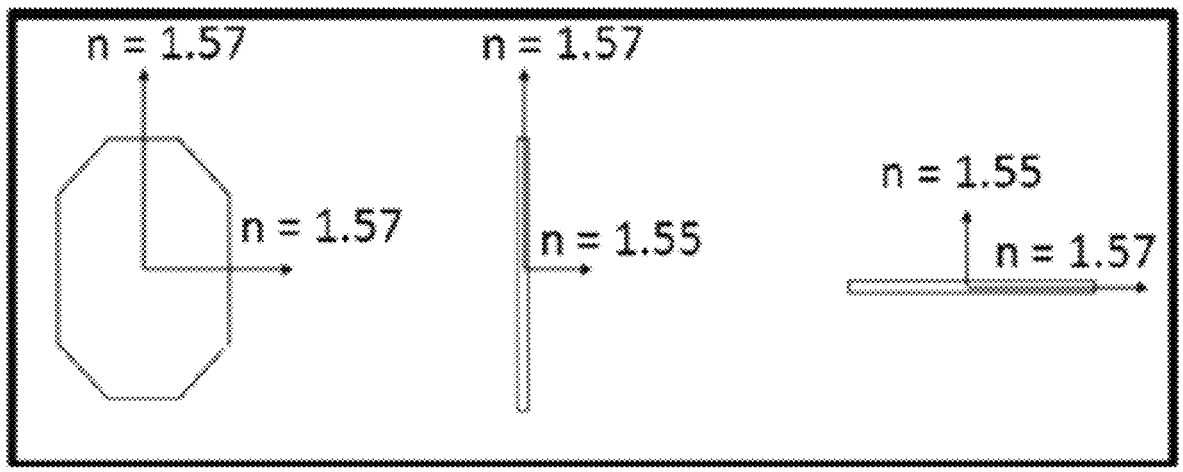
FIG. 5C provides a schematic showing in-plane and out-of plane refractive index of clay platelet.
Figure 5D:
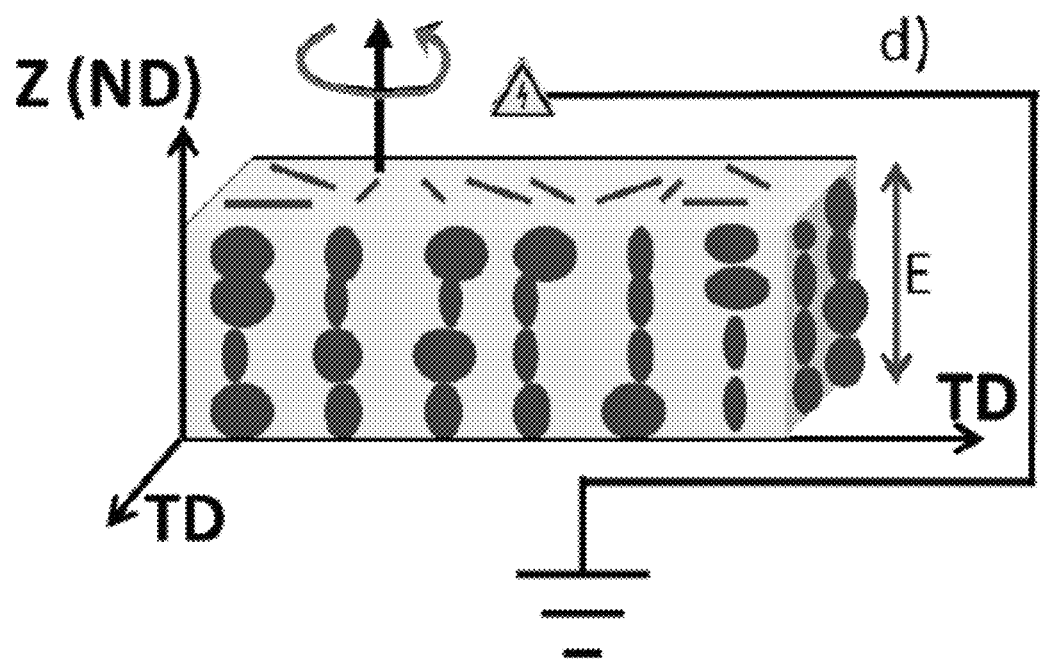
FIG. 5D provides a schematic of clay platelets aligned in polymer films.

As mentioned earlier, the montmorillonite based clays are optically anisotropic. They exhibit the same refractive index, 1.57, in all directions within the basal plane (001). Normal to the basal plane, the refractive index is 1.55 making the intrinsic birefringence $\Delta n°clay = n°\perp - n°\| = -0.02$ (FIG. 5C). This showed that the (001) planes orient along the thickness or the electric field direction when e-field is turned on. Simultaneously, we observed zero in-plane retardation as these particles exhibit rotational randomness in the through-view direction as the $n°\perp$ and $n°\|$ values statistically average leading to zero in plane retardation and thus birefringence (FIG. 5D).

Polarized light microscopy is useful in assessing the orientation of individual particles when they exhibit inherent anisotropy. Optical micrographs (FIG. 6) were taken with first order red tint lambda (λ) plate (553 nm, red wave plate) inserted with the gamma direction (highest refractive index direction indicated in FIG. 6) at 45° to the crossed polarizer and analyzer. The particles oriented with higher refractive index axis parallel to the gamma direction (slow axis) appeared blue as they were in retardation addition position and particles with higher refractive index normal to the gamma direction appeared yellow as they were in subtraction position.

The clay platelets aligned in-plane were observed under the polarized optical microscope with a red wave plate. When a randomly oriented monomer mixture of clay platelets was placed under the cross polarizers and the red wave plate, all observable colors including yellow and blue color platelets were seen as they were oriented in different directions due to randomness of the mixture. With the application of electric field normal to the slow axis of the red wave plate all particles turned yellow; similarly when electric field direction was parallel to the slow axis, they turned blue. As discussed earlier, clay platelets exhibit higher refractive index (1.57) in the basal plane when compared to the normal to the plane (1.55). Therefore, with the application of electric field all platelets changed to the same color under the red wave plate showing that the major axis or the higher refractive index axis was oriented in the direction of the electric field. However, it is important to note that since the refractive index of the clay platelets within the basal plane was the same in all directions, clay particles with this orientation appeared red.

Figure 6A:
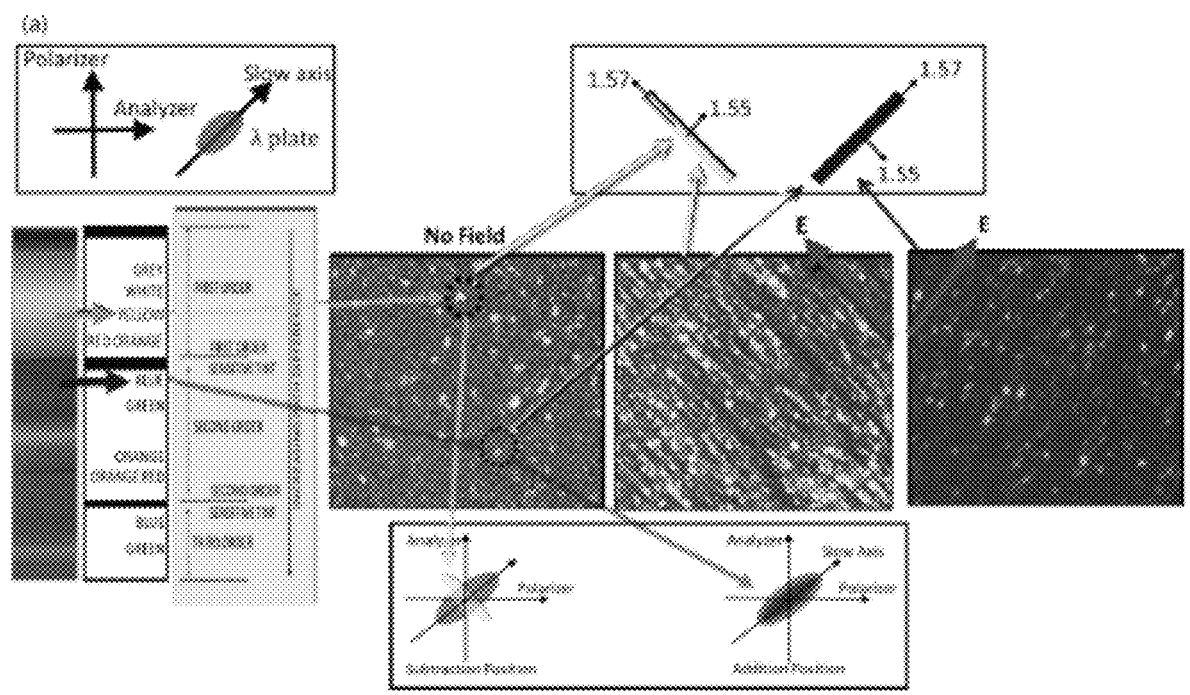
FIG. 6A provides the birefringence response of clay platelets aligned under electric field observed with polarized optical microscope with first order red wave plate.
Figure 6B:
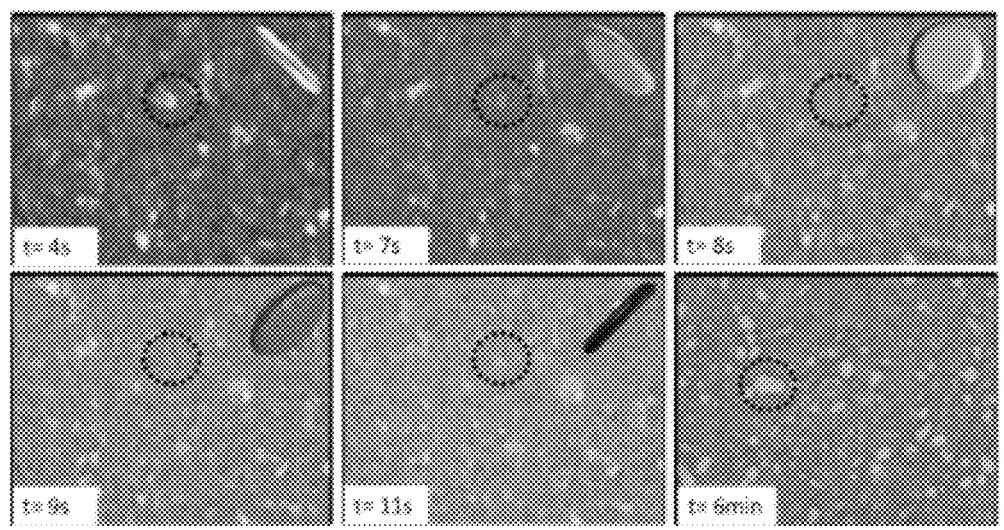
FIG. 6B provides a time sequence images showing rotation of particles in the electric field (40V/mm) with the electric field parallel to the slow axis of red wave 1 plate.
Figure 6B:
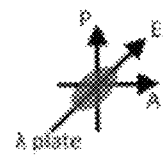

When the electric field (V=40V/mm) application direction set parallel to the slow axis, the time sequence of images showed rotational motion of the highlighted clay platelet. The color of the particle changed from yellow (subtraction position) to blue (addition position) as it rotated with higher refractive index parallel to the electric field or parallel to the slow axis of the red wave plate (FIG. 6). As depicted by the schematic, the yellow particle first rotated to go to darker red state at t=8 s where Δn=0, following this state it became blue (t=11 s) depicting the higher refractive index or major axis parallel to the red wave plate. With increasing voltage, the color transition occurs faster showing faster orientation of particles. Above a critical voltage, all the particles turned blue instantaneously upon the application of the electric field oriented parallel to the slow axis. The video in the supplementary information shows the real time transition of particles from randomly oriented state to aligned state where higher refractive index of the clay platelets align in the direction of the electric field.

Figure 8A:
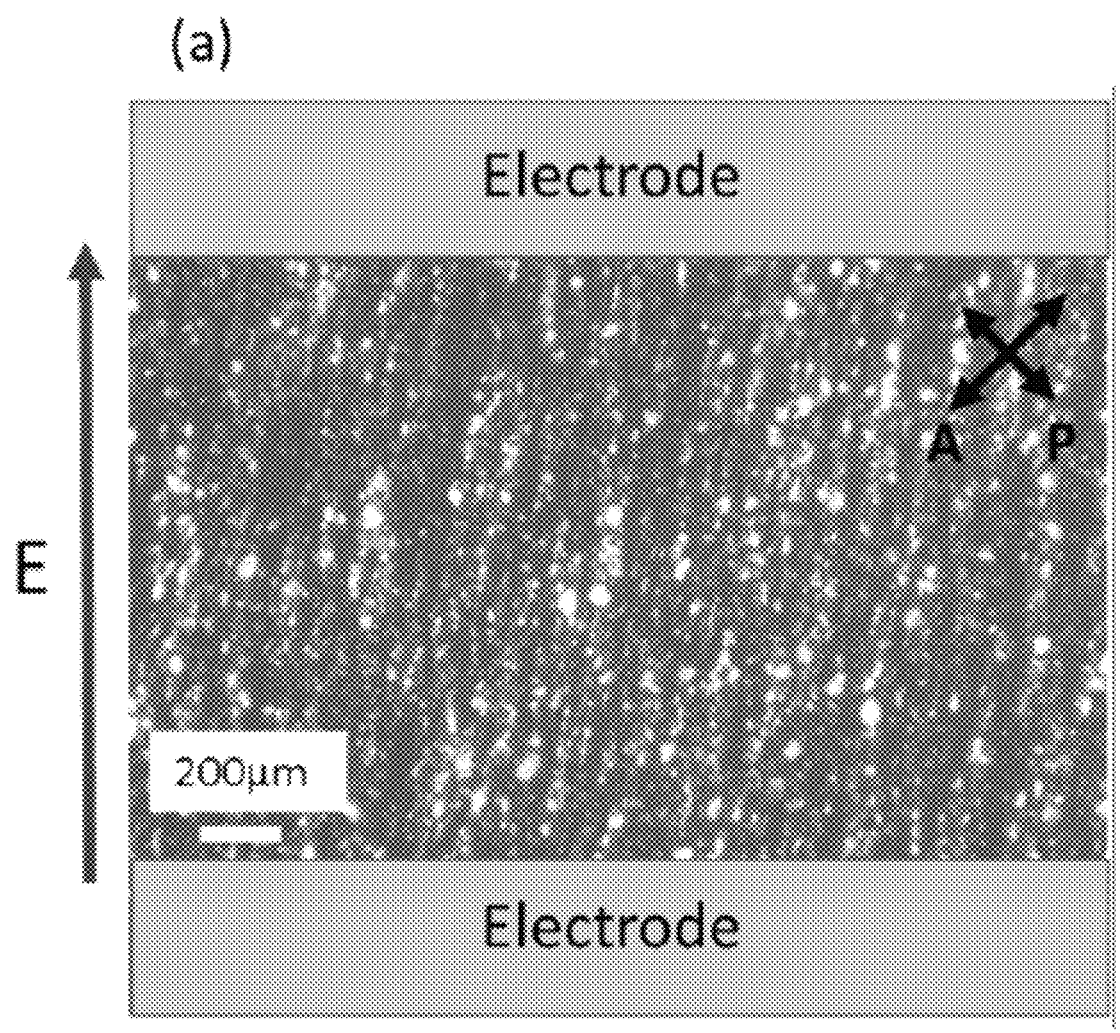
FIG. 8A provides an image of chaining of clay platelets during a) in-plane alignment under polarized optical microscope.
Figure 8B:
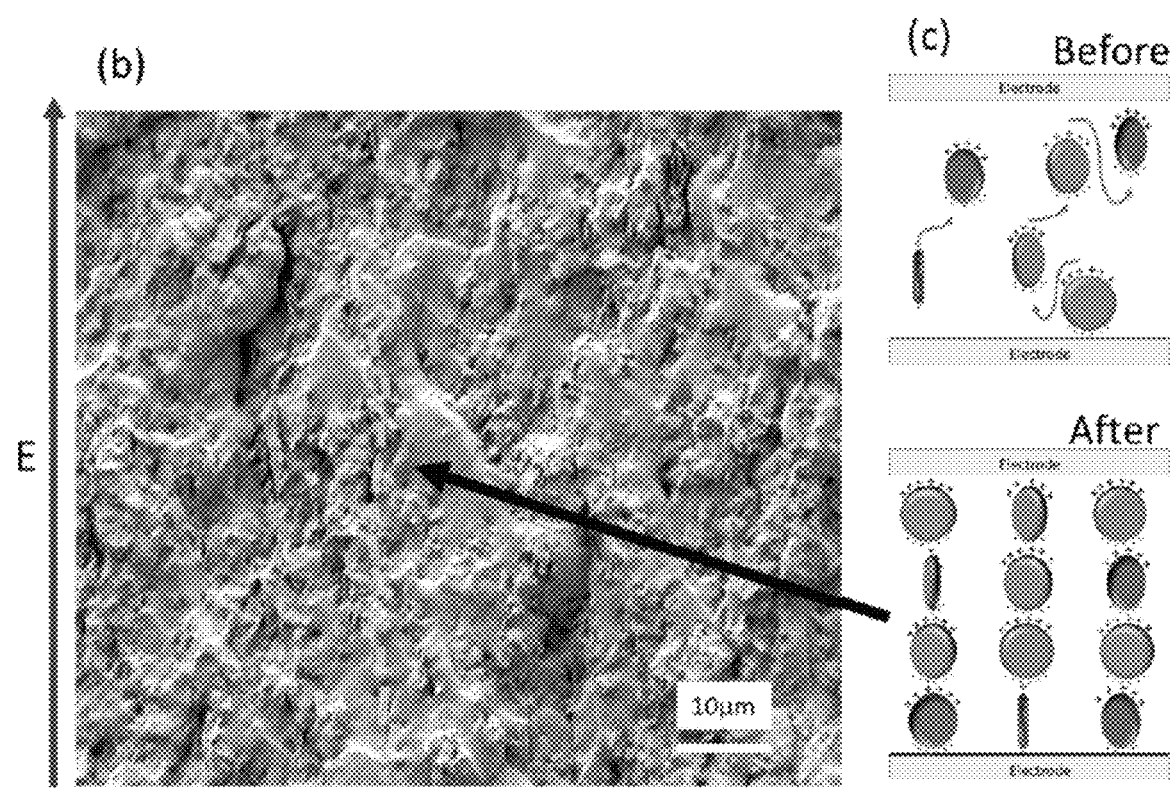
FIG. 8B provides an image of chaining of clay platelets during out-of-plane alignment observed under SEM, one of the chains is marked with yellow lines and a schematic of the dielectrophoretic alignment.

Dielectrophoresis additionally causes both rotational and translational motion due to non-uniform field. An important manifestation of dielectrophoresis is dipole-dipole interaction that occurs even in a uniform electric field, a polarization field on one inclusion disturbs the electric field on the neighboring inclusion, hence producing attractive and repulsive forces between these inclusions. These attractive and repulsive forces lead to formation of chains of the inclusions in the matrix (FIG. 8B). To observe the formation of chains and aligned orientation the morphology of the clay nanocomposites was studied using the optical and electron microscopes.

Figure 7:
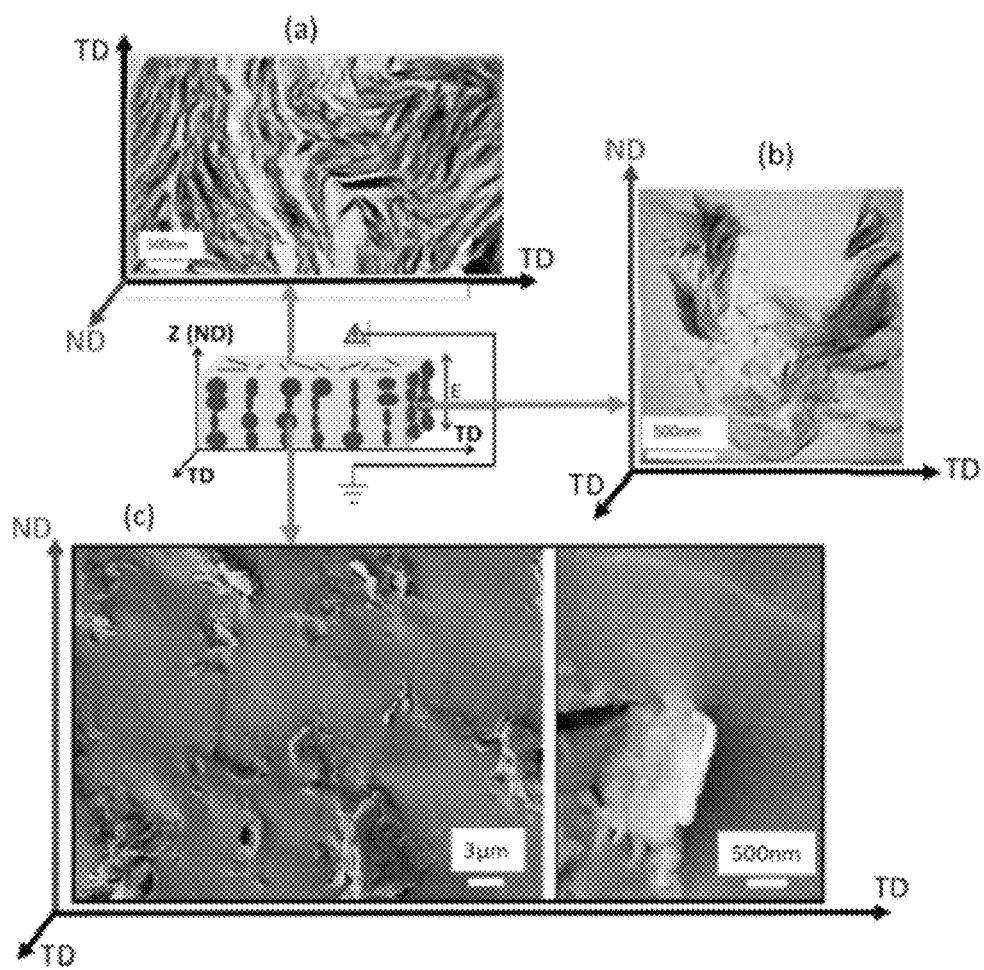
FIG. 7 provides surface and b) cross section TEM images of microtomed oriented samples showing in-plane and out-of-plane orientation and c) cross section SEM images showing orientation of clay platelets with major axis aligned parallel to electric field.

As can be seen from the TEM images (FIG. 7), only edges of the clay platelets were visible when observing the oriented film in the direction perpendicular to the electric field (top view); however, in the cross-sectional view (side-view) i.e. parallel to the electric field direction, random orientation of clay platelets was observed (FIG. 7) showing an out of plane orientation and a random in-plane morphology as depicted by birefringence studies. Examination of surface parallel to the electric field through SEM, revealed that the major axes of the clay are aligned parallel to electric field (FIG. 7).

Optical microscopy and SEM were used to observe the chaining of the tactoids and single platelets by studying the surface parallel to the electric field direction. To observe the chaining in polarized optical microscope, the clay platelets were aligned in the plane of the nanocomposite film using two electrodes attached to the glass slide with the monomer mixture in between them (FIG. 8A). To further illustrate the chaining, we recorded a video under the polarized microscope shown in the supplemental information. The SEM images show the overall view of the cross section where the edges of the clay platelets were chained in the direction of the electric field, one of the chains is marked for ease of observation (FIG. 8B). The orientation of clay platelets was random in the plane as both (001) plane and perpendicular to (001) plane were oriented in the direction of the electric field in the same chain.

Colloidal particles suspended in aqueous medium, liquid crystals and other dilute systems have complex frequency dependence on electric field polarizability. The effect of frequency depends on the composition, shape, size, electric double layer and conductivity of the solvent. A series of tests at constant voltage and particle concentration with varying frequency from DC to 1 kHz (system limitation) was carried out for clay platelets in photocurable monomer system. However, in contrast to the colloidal particles and liquid crystal systems, no frequency dependence in the maximum orientation or rate of change of orientation was observed in our system. Similar observations have been previously seen for clays in viscous solutions.

To study the orientation kinetics, electric-birefringence studies were carried out at varying concentrations and voltages. A constant frequency of 100 Hz was used for all the experiments as we did not observe any frequency dependence during electric field alignment at a constant voltage.

Figure 9A:
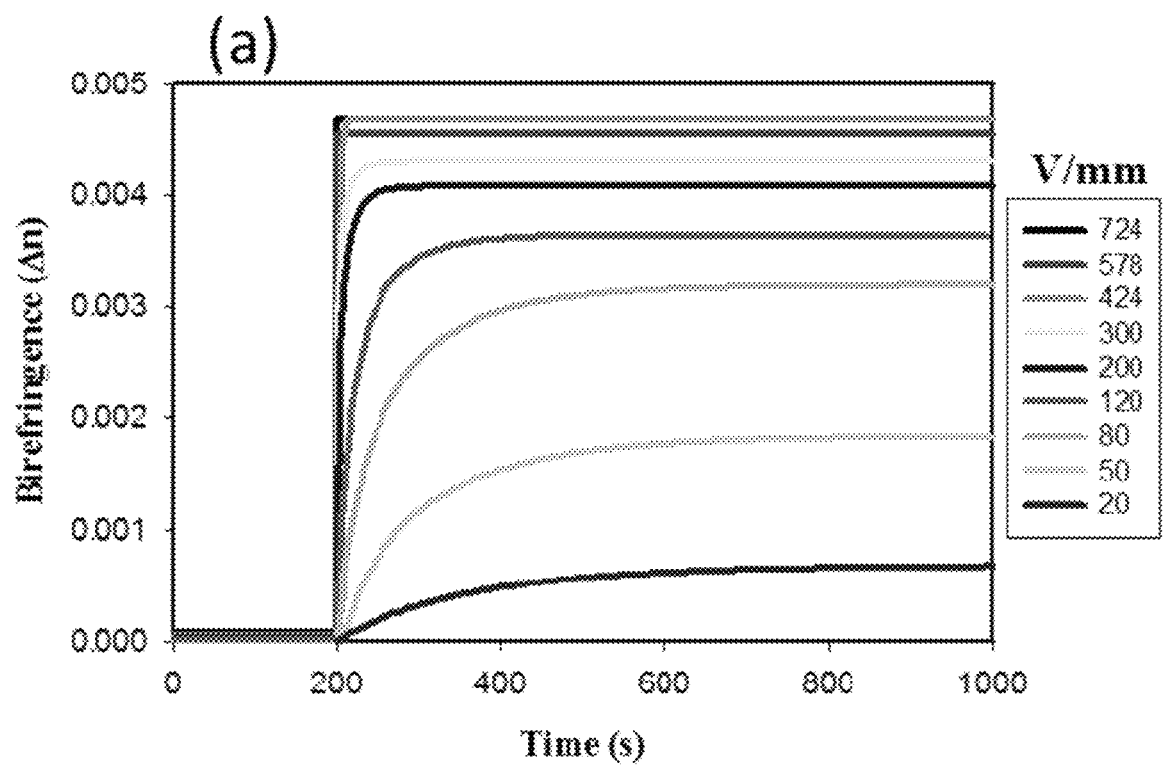
FIG. 9A provides a chart of the kinetics of clay orientation as detected by birefringence response at a series of voltages and clay concentration of 2 wt. %.
Figure 9B:
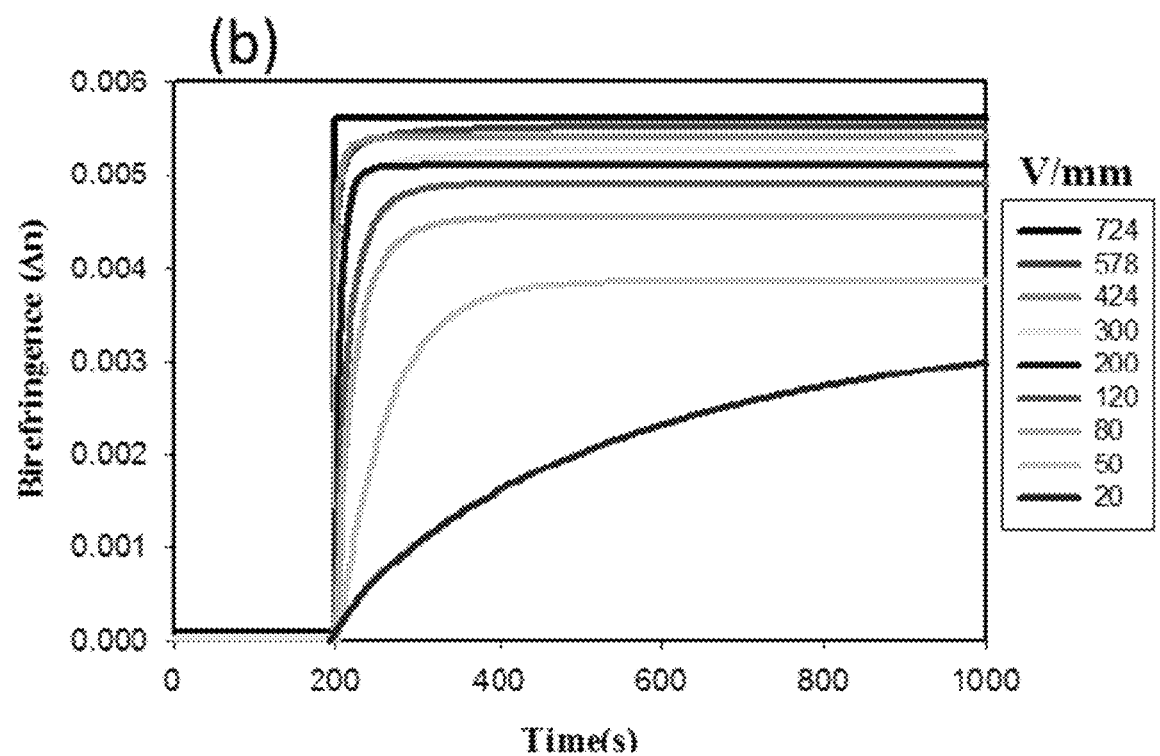
FIG. 9B provides a chart of the kinetics of clay orientation as detected by birefringence response at a series of voltages and clay concentration of 4 wt. %.
Figure 9C:
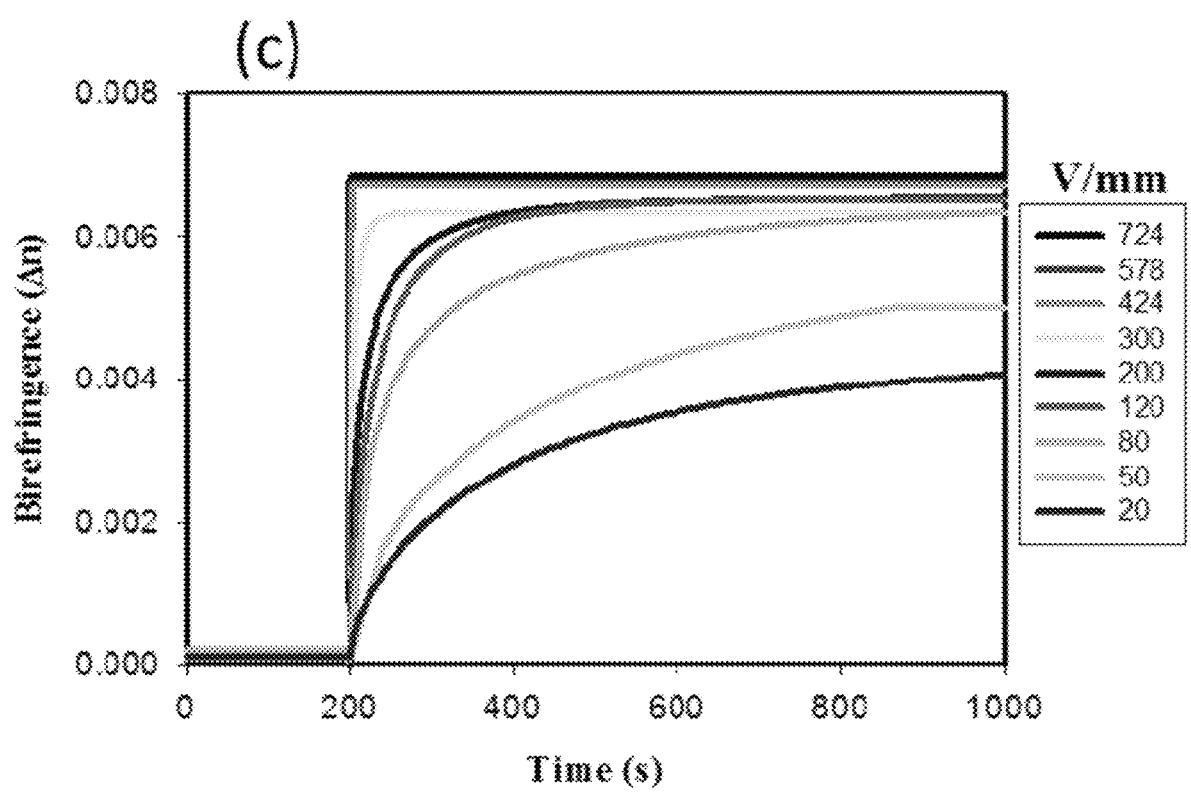
FIG. 9C provides a chart of the kinetics of clay orientation as detected by birefringence response at a series of voltages and clay concentration of 6 wt. %.
Figure 9D:
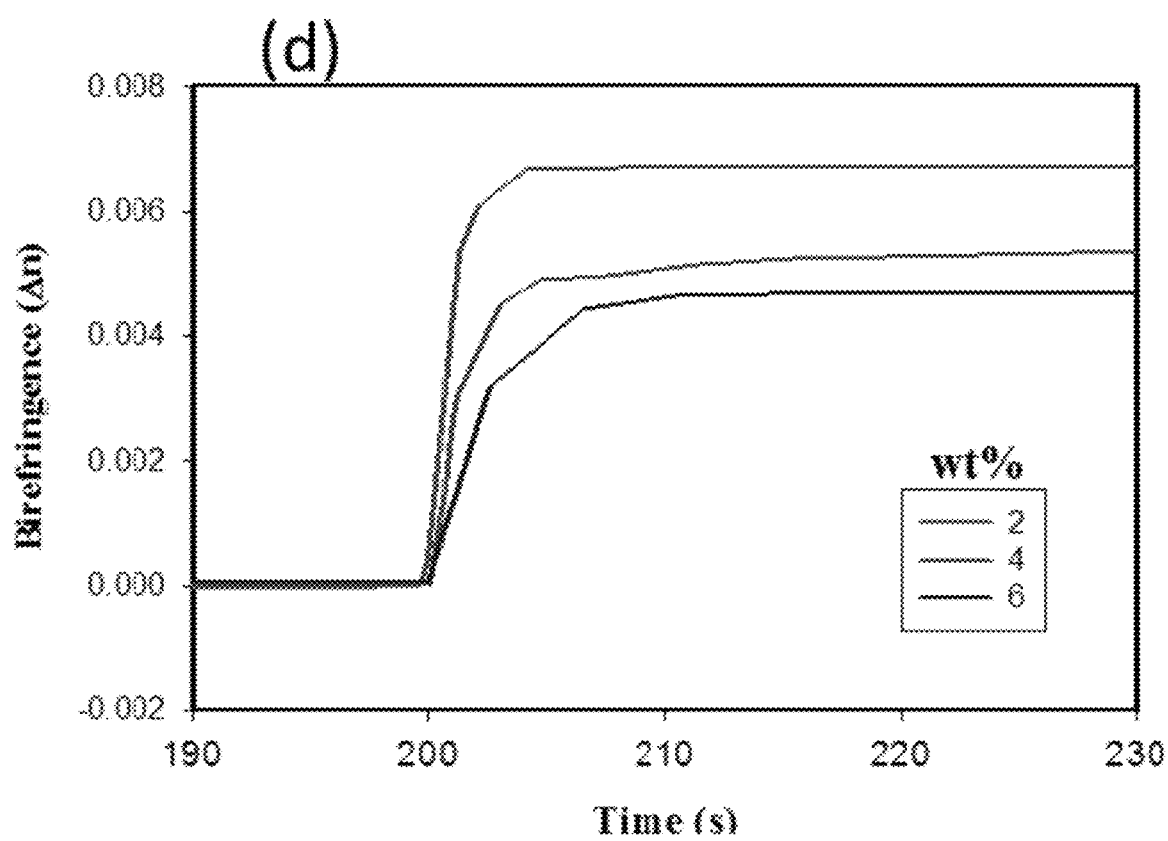
FIG. 9D provides a chart of birefringence response to varying clay concentrations at fixed voltage of 120V/mm.

At low voltages, the birefringence rise was slow and eventually reached a plateau value at relatively low levels (FIGS. 9A,B,C, and D). As the voltage was increased, the rate of rise of birefringence and final plateau value rapidly increased. Needless to say, viscosity plays a very important role in the reorientation kinetics. For the particles to rotate and orient, the torque due to dielectrophoretic force which is directly proportional to induced dipole and applied voltage has to be greater than the inertial and drag forces contributed by the viscosity. The viscosity increased with increase in clay concentration, along with the interparticle interactions. At higher concentration of clays, it was difficult to get exfoliated structures of the platelets, hence the size of tactoids were much larger compared to low concentrations. When the three different concentrations of clay were compared at a single voltage, both the rate of orientation and final orientation decreased with increasing clay concentration (FIG. 9D).

To further elucidate and study the effect of voltage on the alignment of clay platelets at varying concentrations, the electro-optic behavior was expressed using the following equation which helps to correlate the birefringence values with the voltage and exposure time:

$$\frac{\Delta n^V|t| - \Delta n_0^V}{\Delta n_f^V - \Delta n_0^V} = 1 - \exp\left(\frac{-t}{a_V}\right) \quad (3)$$

where, $\Delta n^V|t|$ is the birefringence at any time t, $\Delta n_0^V$ is the initial birefringence, $\Delta n_f^V$ is the final birefringence and $a_V$ is the characteristic time for the applied voltage V.

Figure 10A:
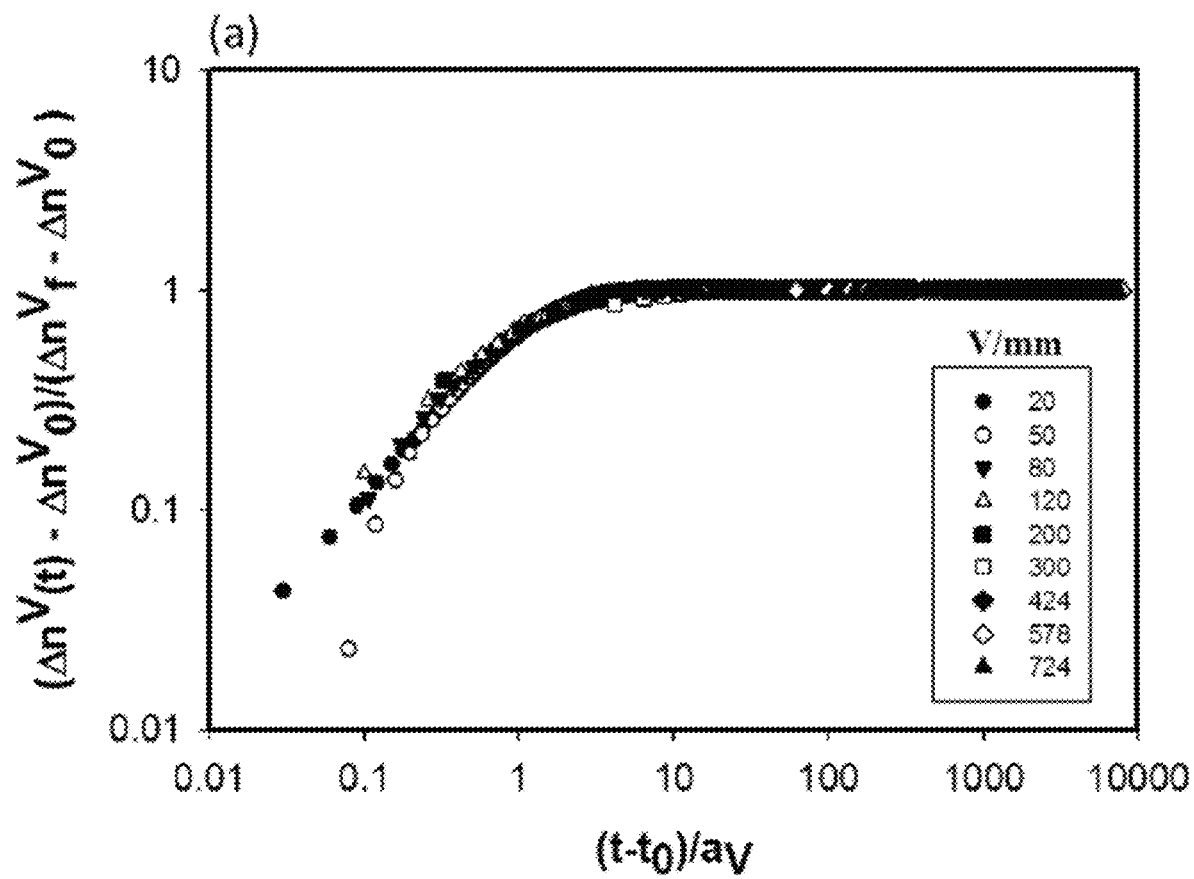
FIG. 10A provides a chart of master curves from normalized birefringence and reduced time developed using electro-optic superposition principle (EOSP) for 6 wt. % clay loading.

Above equation can be used to fit the non-linear response of the clay during alignment under electric field. It can also be used to predict Δn values for all voltages and concentrations of clays which implies the electric field strength and duration time are complementary. Therefore, normalized birefringence was plotted as a function of reduced time, $t/a_v$, to obtain a master curve (FIG. 10A) that is independent of the applied field. This was plotted for all three different clay loadings, which, in turn, implies a universal relationship between the electric field strength and time of exposure during the structural development. The equation used is similar to the time temperature superposition, hence it is called the electro-optic superposition principle (EOSP) relating exposure time and electric field strength with orientation.

Figure 10B:
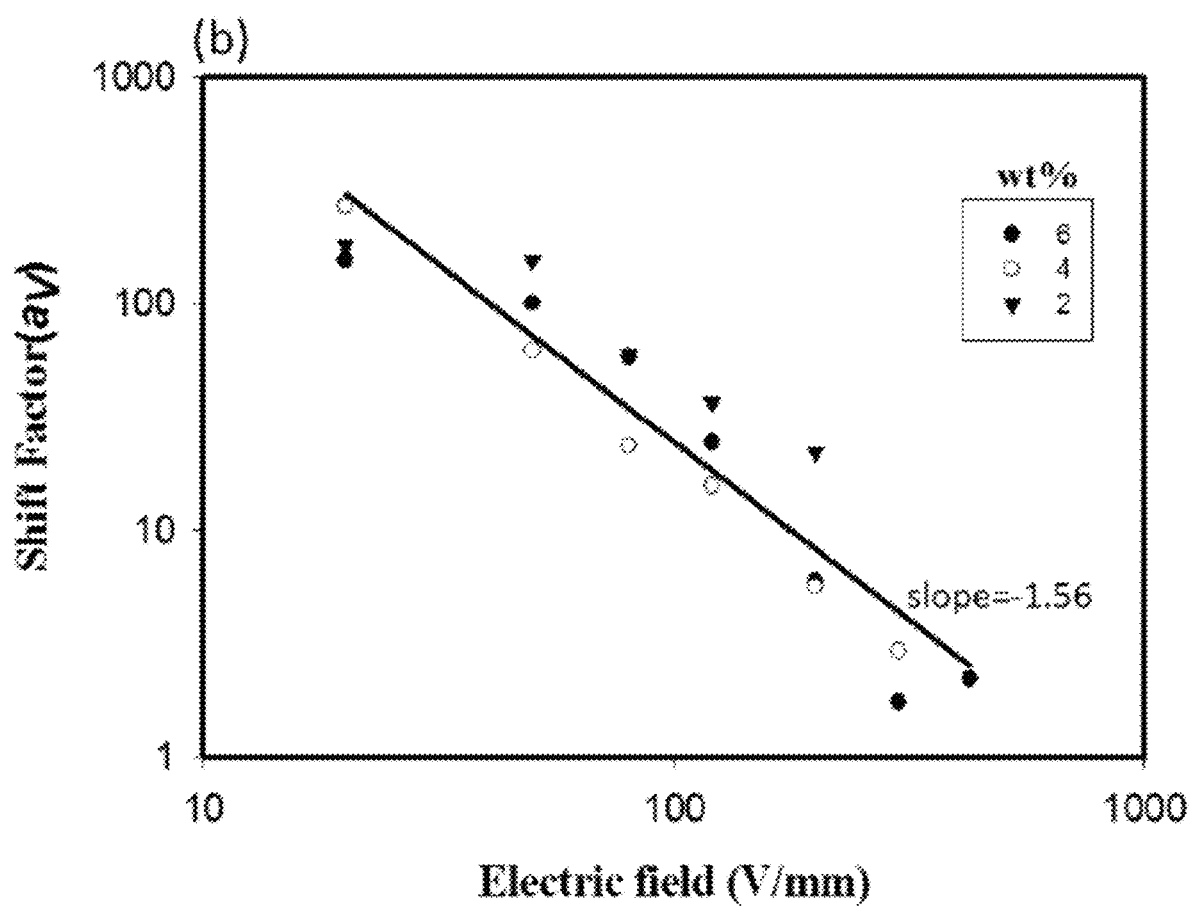
FIG. 10B provides a chart of dependence of shift factor on electric field strength.

Using the EOSP, shift factors were obtained at different voltages. When the shift factors were plotted against the applied voltage, a non-linear response was observed. This was attributed to the fact that above a saturation voltage, there was little or no change in the birefringence and the rate at which the birefringence value was achieved, but at lower clay concentrations the saturation voltage was much lower compared to samples with higher clay loading. As indicated earlier, this is because of the increase in viscosity with higher loading and also increase in frustration between the particles due to interparticle interaction during electric field alignment. However, the linear response of the shift factor, which was similar at all three concentrations of clay loading, indicated that the shift factor has an exponent of −1.5 (FIG. 10B). Hence, the EOSP can be used to tailor the alignment of anisotropic particles under electric field by selecting the voltage and time for desired orientation.

Figure 11A:
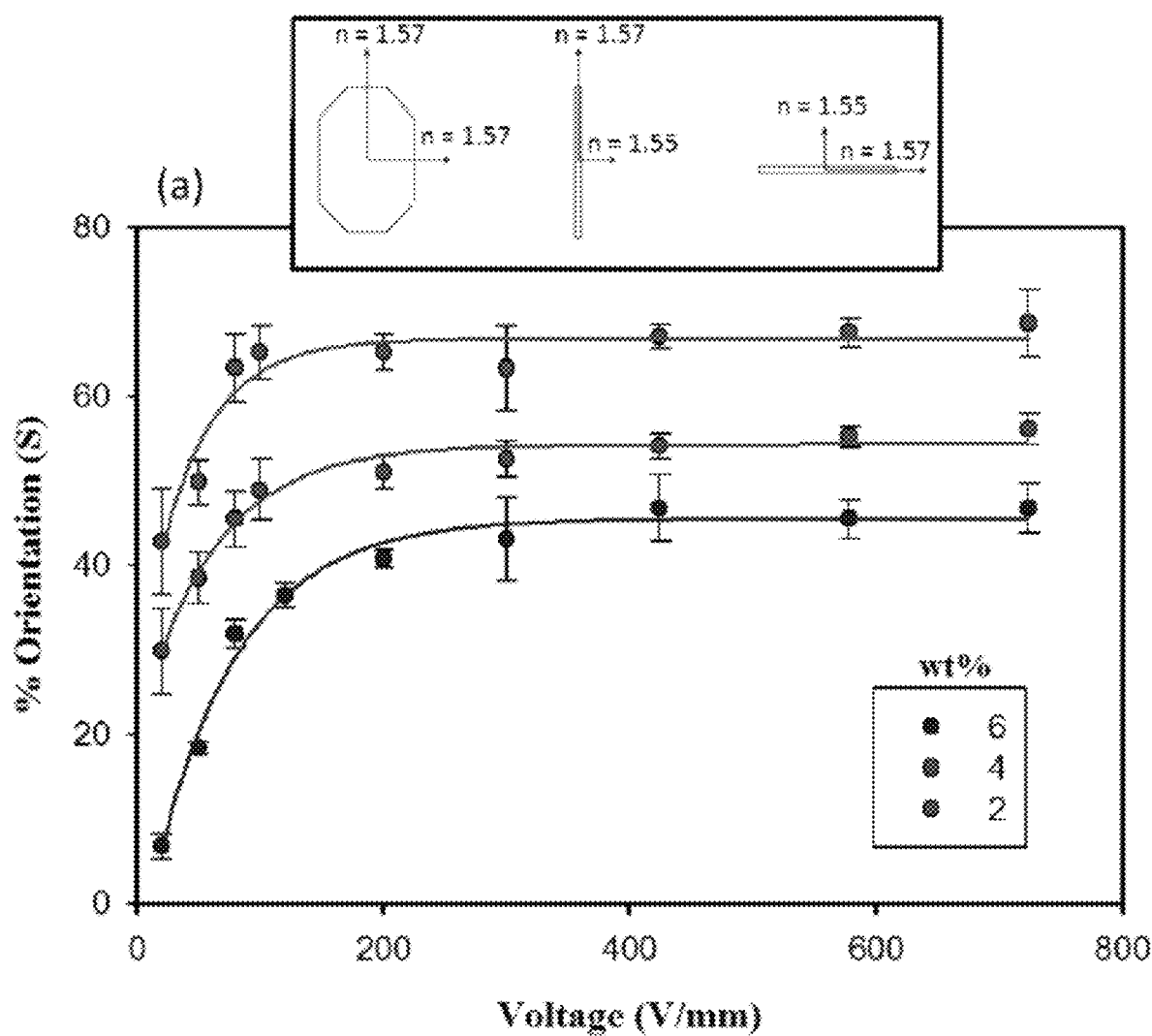
FIG. 11A provides a chart of the effect of voltage on change in orientation calculated through birefringence.

The induced orientational order parameter can be calculated from the birefringence values using the following equation:

$$\% \text{ orientation} = \left(\frac{\Delta n - \Delta n_0}{\Delta}\right) \times 100 \quad (4)$$

where, Δ=0.01 intrinsic birefringence of the clay platelets (FIG. 11a inset) as the matrix resin does not contribute to the measured orientation as mentioned earlier.

Figure 11B:
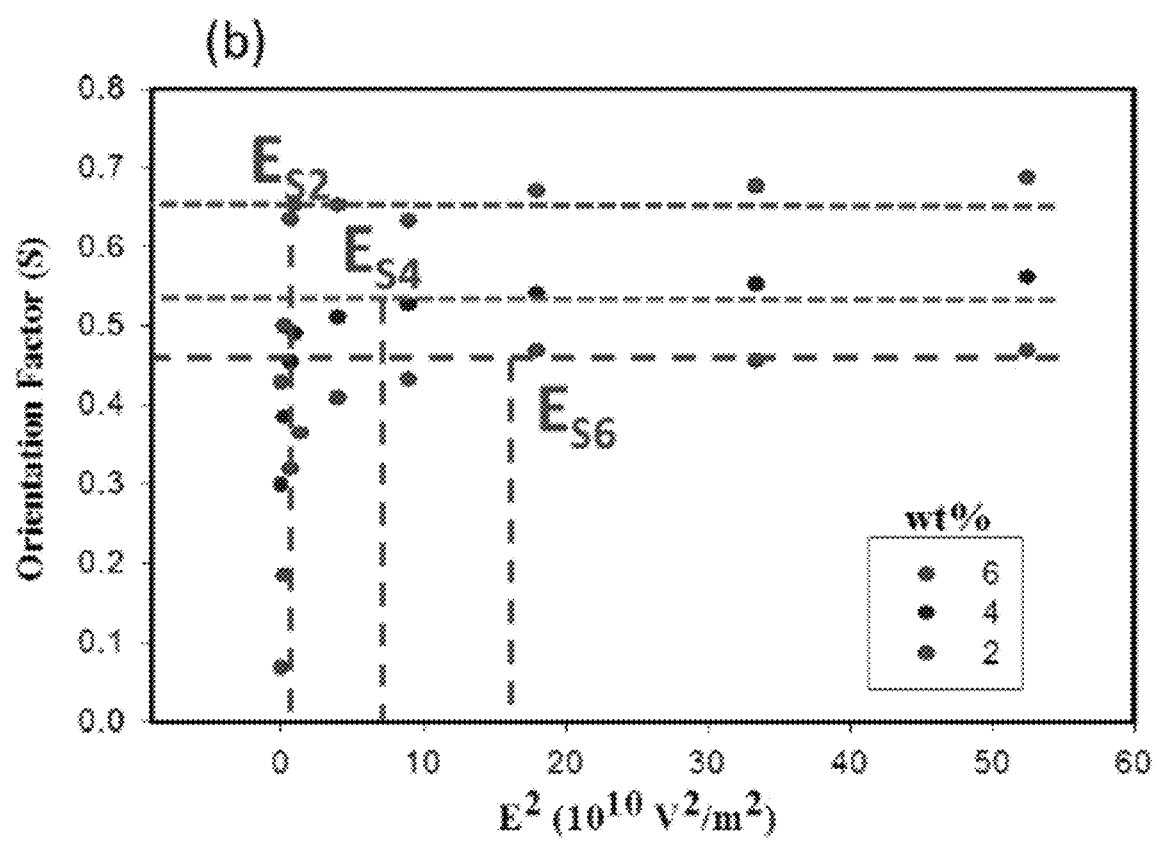
FIG. 11B provides a chart measuring saturation voltage with varying clay concentrations (Es2, Es4 and Es6 are saturation voltages at 2, 4 and 6 wt. % clay loadings.
Figure 11C:
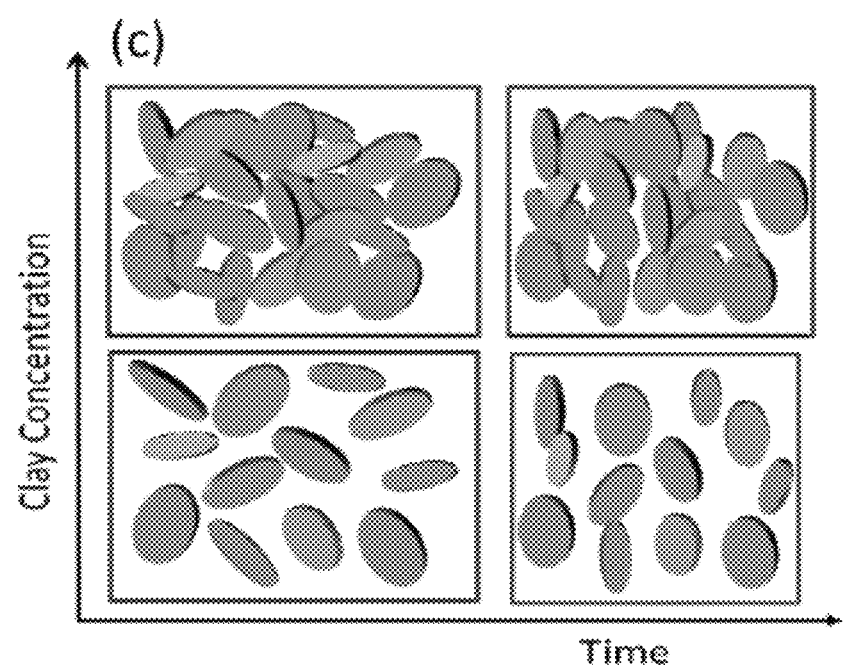
FIG. 11C a schematic of movement of clay platelets with change in clay concentration.

With the increase in clay loading, the level of orientation decreased (FIGS. 9A, B, C, and D). With 2 wt. % clay loading, the orientation of clay platelets through the thickness of the film was around 70-75% (FIG. 10A), however, at higher clay loadings of 6 wt. % the orientation decreased to 5IG0%. This is attributed to the increase in frustration between the particles due to interparticle interaction as shown in the schematic (FIG. 11C). The saturation voltage was also observed by plotting orientation factor with the square of voltage (FIG. 11B). No change in orientation occurred above this critical voltage.

7

Figure 12A:
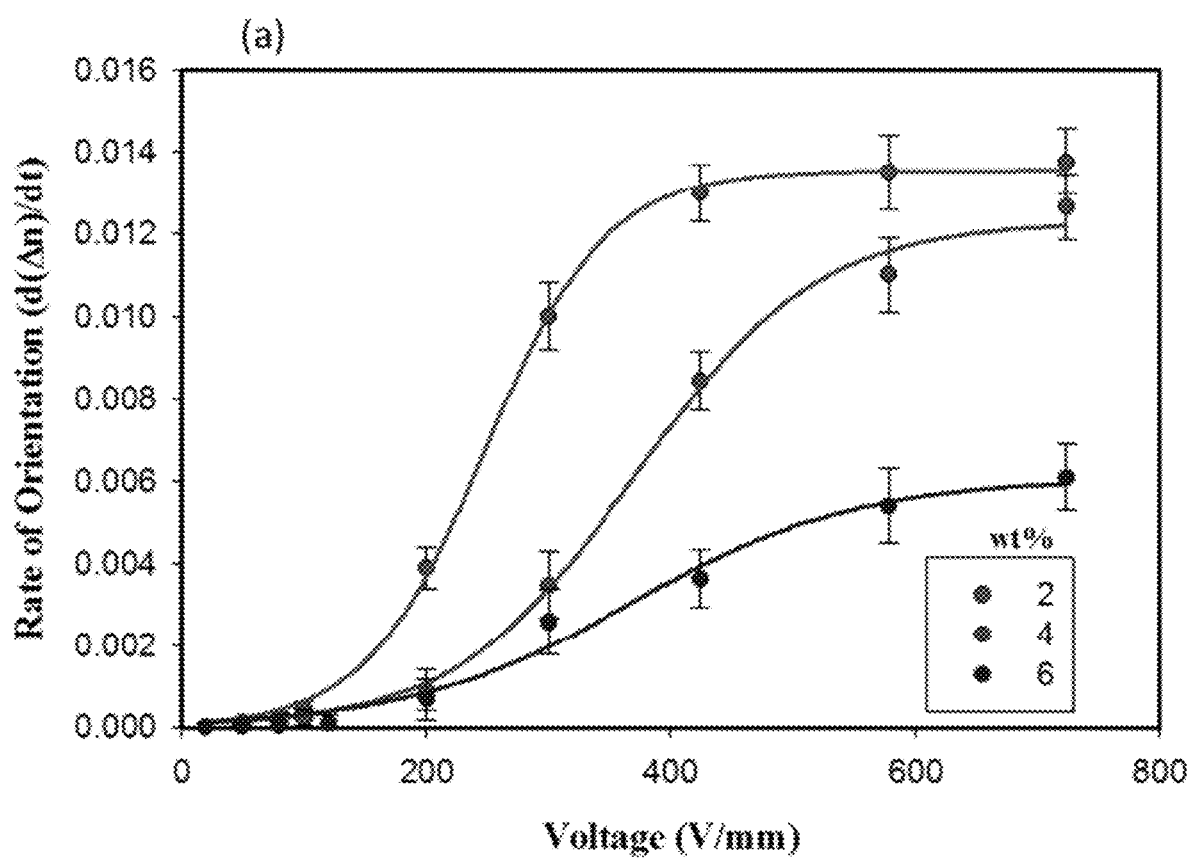
FIG. 12A provides a chart of kinetics of orientation of clay platelets at different voltages and concentrations and b) schematic of movement of single platelet and tactoids in electric field, at a constant viscosity the single platelets/smaller tactoids were easy to rotate.
Figure 12B:
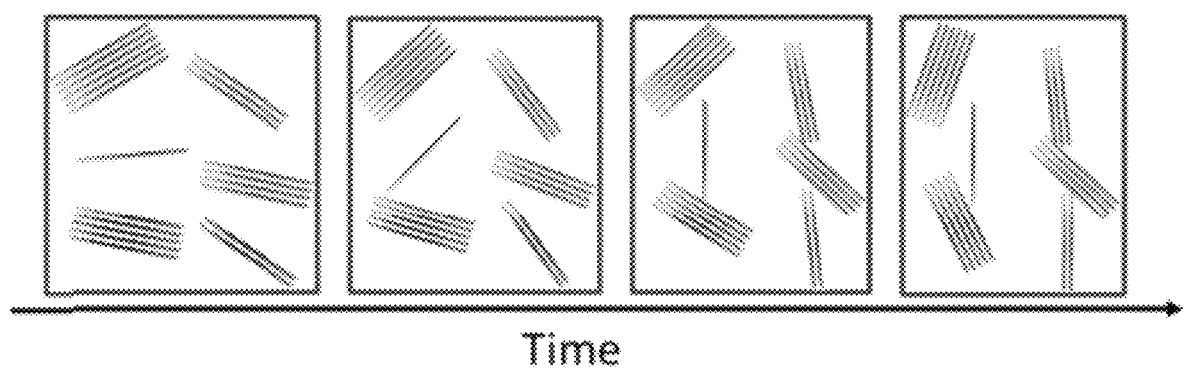
FIG. 12B provides a schematic of movement of single platelet and tactoids in electric field, at a constant viscosity the single platelets/smaller tactoids were easy to rotate.

The rate at which the orientation occurred was calculated from the slope of the birefringence vs. voltage curves (FIGS. 9A, B, C, and D). A sigmoidal behavior was observed for the rate of change of orientation when plotted against voltage (FIG. 12A). The dielectrophoretic force competed against inertia and drag forces as shown in the schematic (FIG. 12B). Hence, at lower voltages only single platelets and smaller tactoids rotated, whereas with increase in voltage, the dielectrophoretic force increased overcoming the inertial and drag forces and giving a higher rate of orientation. Increase in particle concentration increased inertial and drag forces, due to the increase in viscosity and interparticle interaction. Therefore, the rate of orientation decreased considerably with increase in particle concentration.

Figure 13:
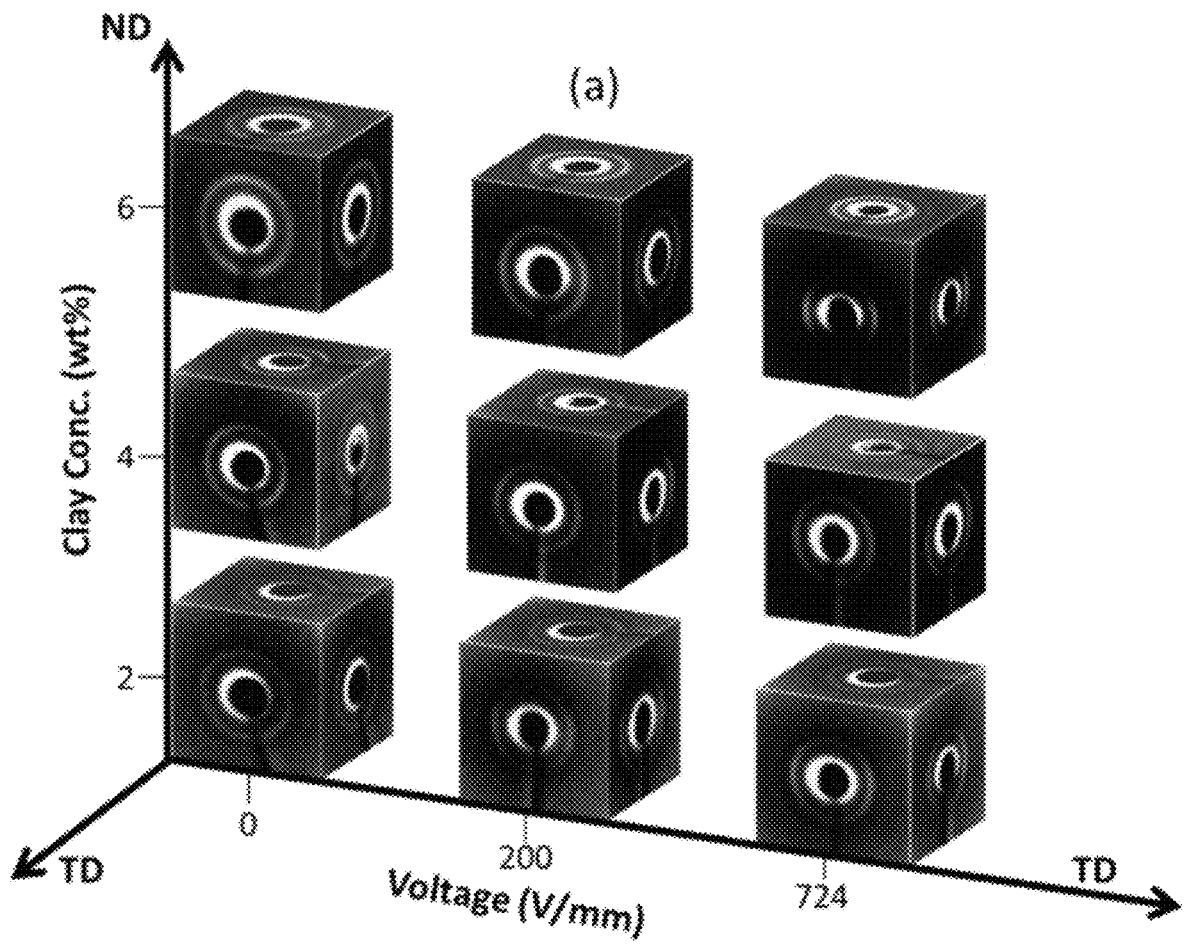
FIG. 13A provides 3D-cubes of WAXD representing the oriented films.
FIG. 13B provides a graph of orientation factors calculated from XRD.
Figure 13:
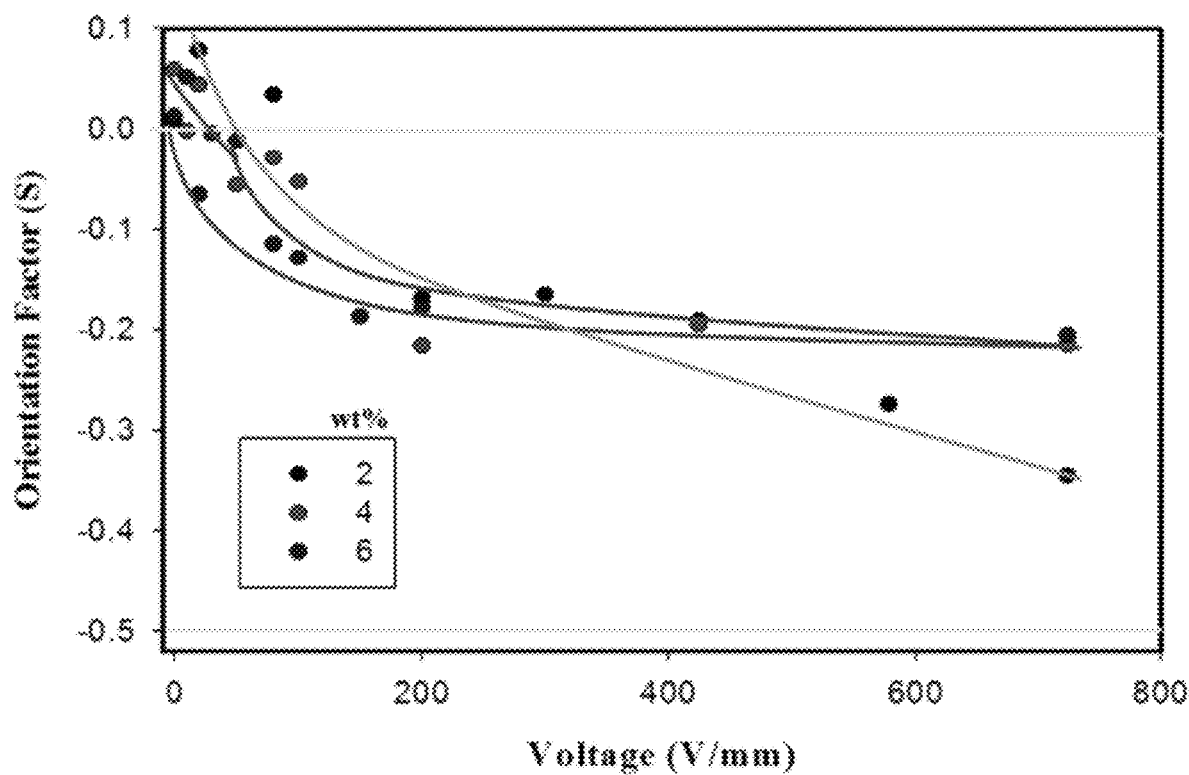
Figure 14A:
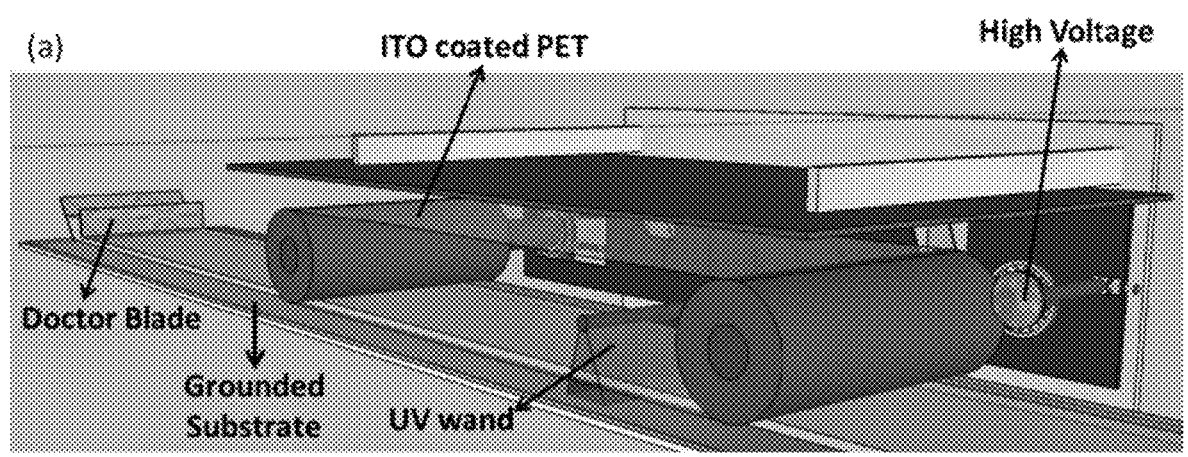
FIG. 14A provides a schematic of Roll-to-Roll processing equipment developed to create indefinitely long oriented films using electric field alignment.
Figure 14B:
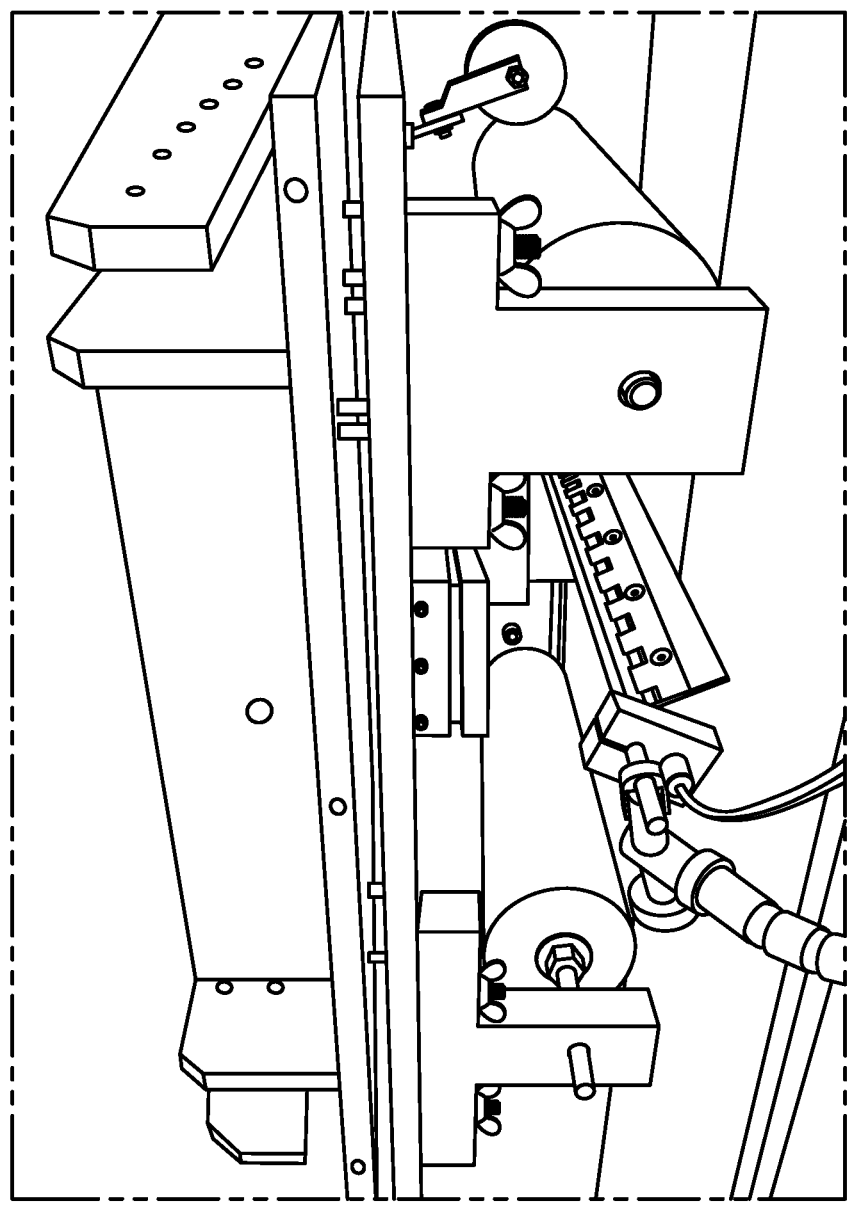
FIG. 14B provides a schematic of Roll-to-Roll processing equipment developed to create indefinitely long oriented films using electric field alignment.

The samples were further characterized off-line using WAXS diffraction patterns for clay orientation. The (001) Bragg diffraction ring from crystal lattice of the still intact layered clay platelets (Cloisite 30B) lied at 18.5 Å. Three X-ray patterns were obtained with X-rays directed along two mutually perpendicular transverse directions (TD) and one out of plane normal direction (ND). With applied voltage, we observed that the clay platelets orient in the Z-direction or the thickness direction of the film, which is parallel to the applied electric field. However, there was no anisotropy and hence orientation observed when the X-rays pass through the thickness of the film were in agreement with the zero in-plane birefringence observations earlier (FIG. 13A). Also, as the voltage increased, the azimuthal breadth of diffraction peak became narrower signifying increase in preferential orientation of these particles. The orientation parameters were further calculated by plotting the intensity as a function of the azimuthal angle, the orientation factor was given by:

$$S=1/2(3 \cos^2\theta-1) \quad (5)$$

where, S is the orientational order parameter and $\theta$ is the angle between the clay platelet and the normal director. For a perfectly oriented system S=−0.5. The order parameter decreased with increasing voltage. As the clay orientation increased, the order parameter at low clay loadings and high voltages was S=−0.4 which is very close the theoretical limit of −0.5.

Orientation factors calculated (FIG. 13B) from birefringence measurements and X-ray diffraction were determined to be distinctly different. Birefringence technique provides ensemble average of orientation of particles regardless of their state of exfoliation and is very sensitive to rapid changes in optical anisotropy. WAXS relies on the presence of crystalline lattice, meaning multiple layered tactoids and intercalated clay structures to show diffraction peak. Hence, the WAXS technique does not sample fully exfoliated platelets and is blind to their reorientation behavior. Since the large particles (tactoids and intercalated particles) reorient slower in a given field due to the drag forces, they exhibit lower orientation as detected by WAXS.

Roll to Roll Electric Field Assisted Alignment

To the best of our knowledge, a Roll-to-Roll manufacturing process for electric field assisted alignment to make Z-oriented functional films has not been demonstrated. The most common approaches for electric field alignment through the thickness are batch processes that include two electrodes separated by spacers, with the solution poured in between the electrodes and cured using thermal or UV curing after the application of electric field; however transparent electrodes are required for UV curable matrices. As has been previously studied, for electric field alignment to be effective, it is necessary to have the two electrodes touching the solution. If the electrodes are separated by an air gap the undulation occurs on the top of the polymer film, since the solution as a whole is polarized and attracted towards the electrode.

Continuous electric field alignment of clay particles dispersed in photocurable resin as the matrix was carried out. The electric field setup is part of a newly developed large roll-to-roll manufacturing machine called Electromagnetic Processing (EMP) line, detailed elsewhere, and is capable of applying three electric, magnetic and thermal gradient fields depending on the specifics of the materials to be oriented.

The electric field setup consists (FIGS. 8A, B, and C) of two PVC rollers that are connected to a back plate that in turn sits on two rails connected to pneumatic motor used to jog the whole assembly upwards and downwards (Z-direction), thereby controlling the distance between the rollers and the steel belt or any conducting substrate acting as ground. A continuous loop of transparent ITO coated PET film surrounds these rollers and it is pre-tensioned using the spring loaded assembly on one of the rollers. This ensemble acts as the top electrode. The rollers are also connected to a drive motor allowing a forward and backward motion of the ITO coated PET at different speeds. In most cases the speed of the ITO coated PET film on top of the rollers is matched with the speed of the stainless steel belt below. This is done to prevent any shearing effect on the cast film. After adjusting the speed, the whole assembly is lowered to match the distance between the PET film and the substrate to that of the thickness of the cast films. A copper roller is placed on top of the PET film, this copper roller is connected to a high voltage power supply. The HV amplifier (Matsuda, model 20B20) can be used to generate a DC voltage, this amplifier is combined with an H-P function generator and can generate three types of fields: AC, DC and biased AC fields. The copper roller is spring loaded and hence is always in contact with the conducting film while rotating with the film as it moves, creating a potential difference between the ITO coated PET film on top and the substrate. A UV wand that radiates at the wavelength suitable for curing the resin to freeze the aligned morphology is placed in the center of the setup.

During a typical process, particles are first dispersed in the photocurable resin using sonication, magnetic stirring, high shear mixing or other dispersion techniques. The monomer mixture is then cast onto the carrier using a slot die or a doctor blade assembly. The blade gap is set using the micrometers or feeler gauges to the desired thickness of the films. The gap between the top electrode film (ITO coated PET film) and the conducting substrate is kept the same as that of the thickness of the cast film. The speed of the substrate and the top ITO coated film is then matched. As the cast film approaches the electric field setup it touches the transparent conducting film on top, while the top electrode is maintained at high voltage using a copper contact roller. After the sample orients due to the potential difference between the two electrodes, it is necessary to freeze the structure before the film reaches the end of the setup. This is done by irradiating UV light uniformly through the width of the sample using a UV wand, curing the cast film. Surface energy of the substrate is always kept higher than that of the transparent top electrode. This helps the film to always peel off from the top electrode making the film stick to the bottom substrate. During the rewinding of the films, these oriented films can first be peeled off and rewound separately or can be wound with the substrate.

Figure 15A:
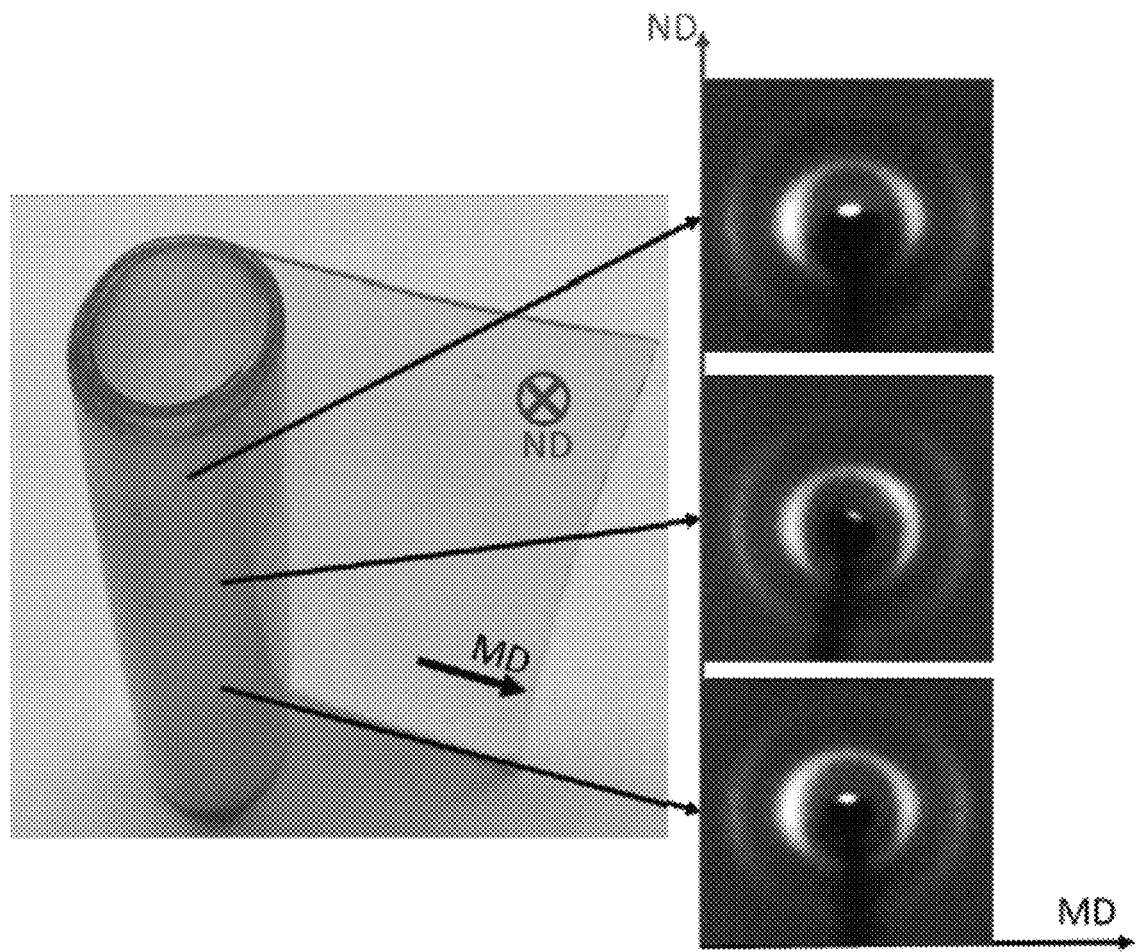
FIG. 15A provides WAXS patterns at different locations for a Roll-to-Roll oriented film with 6 wt. % clay loading at 724V/mm.
Figure 15B:
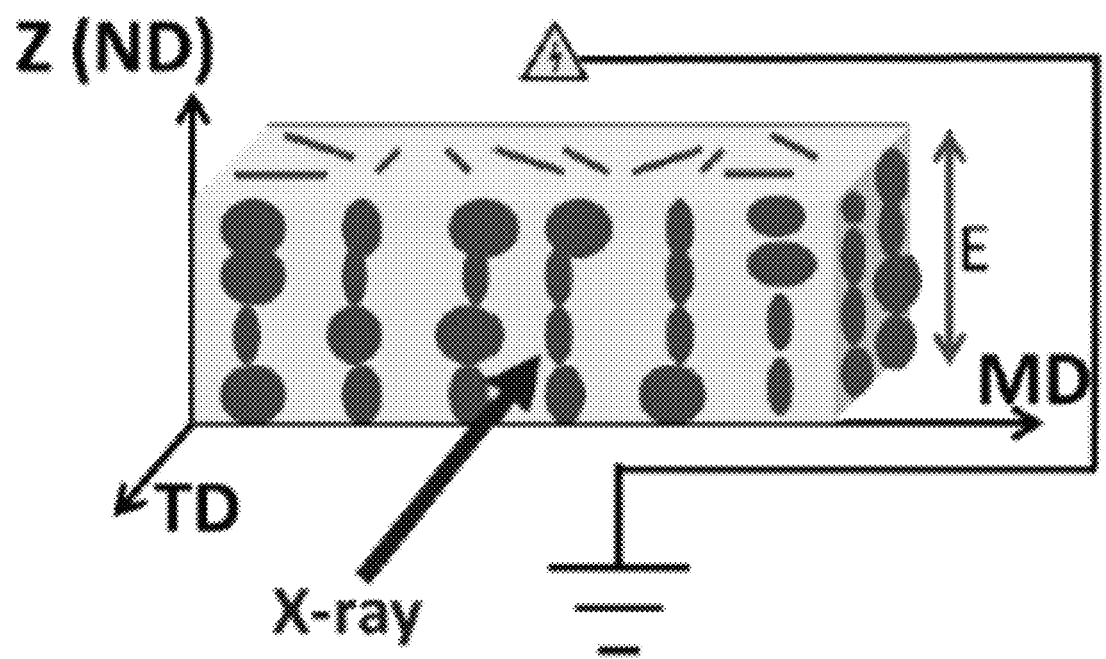
FIG. 15B provides WAXS patterns at different locations for a Roll-to-Roll oriented film with 6 wt. % clay loading at 724V/mm.

To establish that the electric field induced alignment can be accomplished using the roll-to-roll setup with realistic manufacturing conditions, we were able to cast large films of oriented clay (3" wide and 10" long) nanocomposites at 2, 4 and 6 wt. % clay concentration with applied voltage of 724V/mm at 10 cm/min speed. To verify the uniformity of orientation of the samples, WAXS patterns were obtained at different positions in the sample. The aligned 6 wt. % clay nanocomposite had the orientation factor S of −0.2∓0.02. FIGS. 15A and b shows the flexible oriented clay nanocomposite film and WAXS patterns at three locations of the film.

Figure 16:
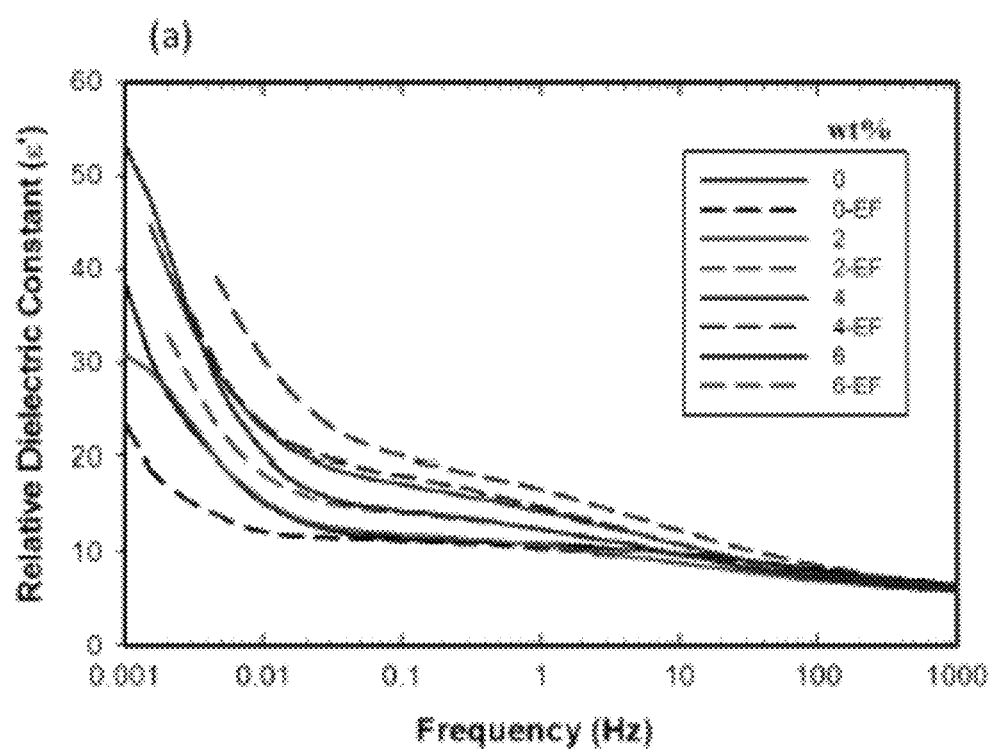
FIG. 16A provides a chart if enhancement of Dielectric properties electric field oriented clay filled nanocomposites relative dielectric constant (EF: Aligned nanocomposite film).
FIG. 16B provides a chart if enhancement of Dielectric properties electric field oriented clay filled nanocomposites dielectric loses (EF: Aligned nanocomposite film).
Figure 16B:
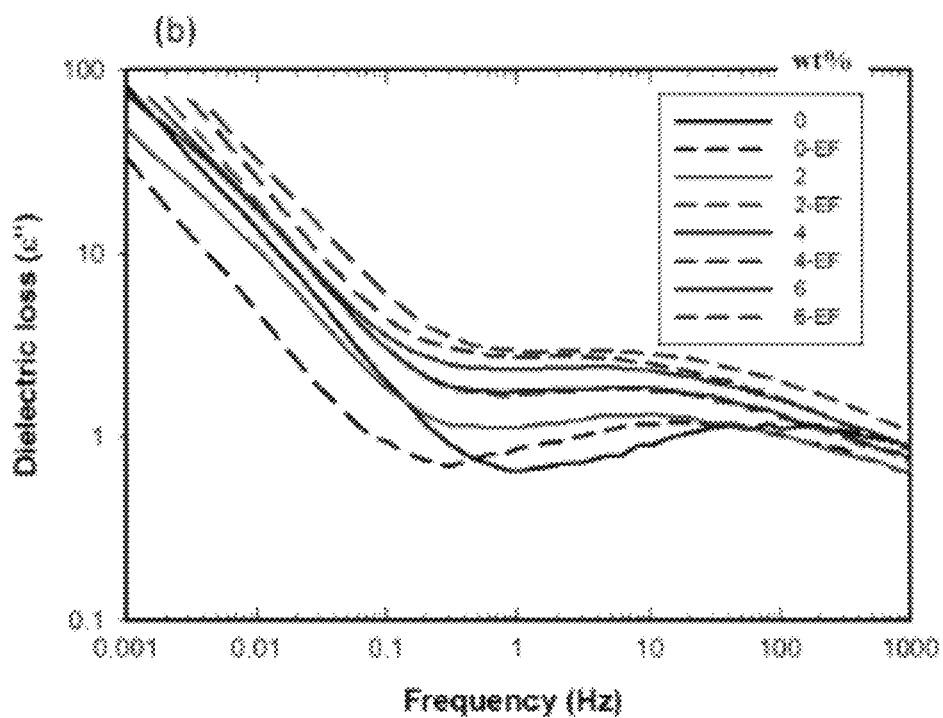
Figure 17:
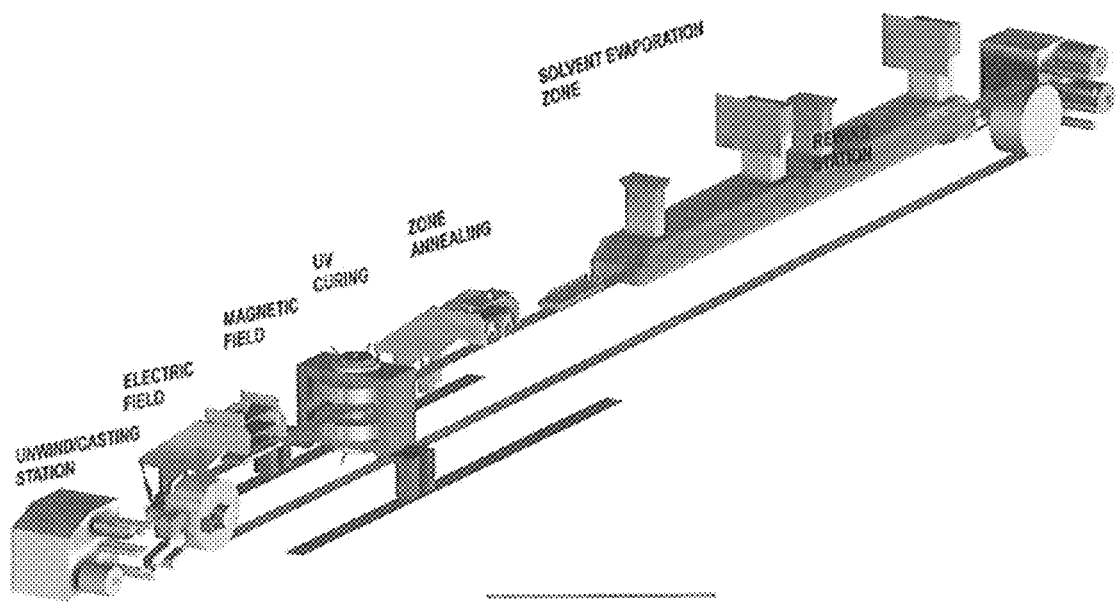
FIG. 17 provides a schematic of a polymer film processing device.

Finally, we demonstrate the enhancement in Z-direction properties of clay nanocomposites using dielectric measurements on the roll-to-roll processed oriented films. The dielectric properties of both oriented and unoriented films at a series of clay concentration were measured through the thickness of the film. FIGS. 16A and B compares the dielectric permittivity and dielectric loss of unoriented and oriented samples at room temperature. Both the oriented and unoriented clay nanocomposites at varying clay concentrations had similar inflection points around 100 Hz, showing a broad interfacial relaxation peak and increase in both the dielectric constant and the loss towards lower frequencies. This phenomenon is known as low frequency dispersion which in this case is related to ionic conductivity leading to electrode polarization. Hence, the increase in dielectric properties below 100 Hz can be related to ionic conductivity of clay platelets since this inflection point is not observed in unfilled polymer films.

Clay nanocomposites have anisotropic ionic conductivity in parallel and perpendicular oriented films. It has been suggested that the difference in ionic conductivity of MMT nanocomposites is due to tortuosity of ionic migration which is caused by the orientation direction of MMT layers perpendicular to the measurement direction. Therefore, MMT nanocomposites show higher ionic conductivity if the MMT layers are oriented in the direction of measurement compared to perpendicular orientation. Below 100 Hz, oriented samples show much higher dielectric constant as compared to the unoriented samples. This is attributed to the fact that the oriented nanocomposites have higher ionic conductivity since the ionic migration is much easier when clays are oriented parallel to the direction of measurement. Also, the oriented nanocomposites have higher interparticle interaction due to chaining of clay platelets caused by dielectrophoretic alignment, making the ionic migration easier leading to the higher dielectric constant for the oriented samples. Hence, Z-oriented clay nanocomposites can be used to increase the ionic conductivity at lower particle concentrations.

The electric field assisted alignment allows Z-(thickness direction) alignment and organization of nanoparticles facilitating the tailoring of properties in this direction. These include thermal conductivity, dielectric properties, barrier properties, ion exchange depending on the filler. In this study, the development of birefringence measurement system was described coupled with electric field. Using this tool, kinetics of "Z" direction orientation in the presence of electric field was studied. This information enabled the development of electro-optic superposition principle that relates the birefringence, voltage and time. As a result, the properties of nanocomposites can be tailored by selecting required voltage and time to obtain required microstructures. The orientation of the clay particles substantially enhanced the ionic conductivity properties in oriented nanocomposites. A Roll-to-Roll process to obtain Z-oriented nanocomposites has also been reported for the first time. This is critical for commercializing oriented polymer nanocomposites with "Z" enhanced properties.

Methods

Clay nanocomposites were prepared using Cloisite 30B (organo-modified clay from southern clay products) as the filler and a photocurable resin Norland 65 (Norland products) as the matrix. Both the matrix and the filler were used as is without any further modifications.

The photocurable resin NOA65 was chosen since it is a colorless, clear liquid photopolymer, thus making the birefringence measurements possible at different wavelengths. It is reported in literature that this compound is made essentially of four constituents: trimethylolpropane diallyl ether, trimethylolpropane tris thiol, isophorome di-isocyanate ester and 5 wt. % photoinitiator benzophenone. NOA65 cures when exposed to ultraviolet light and has fast curing times with maximum absorption between 350-380 nm at ambient temperatures. This eliminates the heat curing and post curing operation common in other adhesives. The fast curing helps to freeze the structure rapidly at required morphology and leads to faster production time during the roll-to-roll process, since the polymer curing is the time determining step when compared to the alignment step which typically takes a few seconds. The curing by UV light generates radicals that start a chain of polymerization reactions according to the standard process. Being a one part system containing 100% solids, the shrinking effects upon curing are minimized and therefore the gap between the two electrodes during the alignment can be kept constant. The cured adhesive is flexible and transparent even at higher clay loadings.

The clay particles were dispersed in the resin using Hielscher UP400S ultrasonic processor and planetary centrifugal mixer (Thinky Mixer) to achieve reproducible dispersion for all samples. The suspensions were then loaded between two ITO coated transparent glasses obtained from SPI supplies with 1 mm glass spacers. Different voltages at varying frequencies were applied between the two conducting ITO electrodes and the retardation was measured real time using the equipment described earlier. The morphology after applied electric field was frozen by shining UV light on top of ITO coated glass using OmniCure 2000 UV lamp.

The morphology of these cured films was characterized using X-Ray diffraction, transmission electron microscope and scanning electron microscope. Bruker AXS Generator equipped with a copper tube and a two dimensional detector was used to obtain the XRD patterns of the oriented films. The generator was operated at 40 kV and 40 mA with a beam monochromatized to Cu Kα radiation. A typical exposure time of 20 min was used. The optical microscope used to study the orientation was a Leitz Laborlux 12 Pol S microscope stage between the crossed polarizers. A first order red wave plate was also inserted with its slow axis oriented at 450 to the crossed polarizers. The pictures of the samples were taken with a DC 290 Kodak Zoom digital camera connected to the optical microscope.

What is claimed is:

1. A method of preparing an anisotropic polymer film comprising: providing a polymer film on a transportable conveyor acting as a second electrode, the polymer film including an orientable component, wherein the orientable component is polymer phases, dispersed particles, or both polymer phases and dispersed particles, the polymer film having a thickness, where the polymer film is UV-curable, supplying an electric field across an electric field application zone, where the electric field is generated by a first electrode positioned above the second electrode and having a first charge, the second electrode having a charge opposite of the first electrode, where the first electrode is a belt wrapped around two rollers, where the belt is a transparent conductive film, rotating the first electrode through the electric field application zone at a rotation speed, transporting the second electrode through the electric field application zone at a transport speed to thereby pass the polymer film through the electric field application zone, where the step of transporting includes contacting the first electrode and the polymer film and inducing orientation of the orientable component, adjusting the height of the belt by moving a back plate that is connected to the two rollers, where the step of adjusting by moving the back plate maintains the contacting of the first electrode and the polymer film, the first electrode includes a voltage source in constant contact therewith, where the voltage source is spring loaded in order to maintain the constant contact, and freezing the polymer film, by applying a UV light, to lock the orientation of the orientable component during the step of transporting and before the polymer film exits the electric field application zone to thereby produce an oriented polymer film, where the orientation of the orientable component is in the direction of the polymer film thickness, where the UV light is positioned between the two rollers and within the wrapped belt.

2. The method of claim 1, where the oriented polymer film is rolled onto a take-up roll after the oriented polymer film exits the electric field application zone.

3. The method of claim 1, where the polymer film includes the dispersed particles, which are dispersed dielectric particles.

4. The method of claim 1, further comprising steps of
measuring the birefringence of the oriented polymer film after the oriented polymer film exits the electric field application zone to obtain an optical anisotropy of the oriented polymer film, and
adjusting one or more parameters of the method based on the obtained optical anisotropy.

5. The method of claim 1, where the electric field is about 724 V/mm.

6. The method of claim 1, where the transparent conductive film is indium tin oxide coated polyethylene terephthalate.

7. The method of claim 1, where the rotation speed of the step of rotating and the transport speed of the step of transporting are the same to thereby avoid shearing of the polymer film.

8. The method of claim 1, where the UV curable polymer film includes acrylic groups.

9. The method of claim 1, where the transparent conductive film blocks a portion of wavelengths not required to cure the UV curable polymer film.

10. The method of claim 1, where the transparent conductive film blocks all wavelengths not required to cure the UV curable polymer film.

11. The method of claim 1, where the UV light is positioned between only two rollers.

12. The method of claim 1, where the two rollers are made of polyvinyl chloride (PVC).

13. The method of claim 1, further comprising steps of
correlating birefringence values with voltage and exposure time by way of the following equation:

$$\frac{\Delta n^V |t| - \Delta n_0^V}{\Delta n_f^V - \Delta n_0^V} = 1 - \exp\left(\frac{-t}{a_V}\right)$$

where $\Delta n^V$ is birefringence at any time t, $\Delta n_0^V$ is initial birefringence, $\Delta n_f^V$ is final birefringence and $a_V$ is characteristic time for applied voltage V,
plotting normalized birefringence as a function of reduced time, $t/a_V$, to obtain a master curve independent of applied field to thereby obtain an electro-optic superposition principle (EOSP), and
tailoring, using the EOSP, alignment of the orientable component under the electric field by selecting a voltage and a time for a desired orientation.

* * * * *